(12) United States Patent
Maher et al.

(10) Patent No.: US 11,828,724 B2
(45) Date of Patent: Nov. 28, 2023

(54) ION GUIDE

(71) Applicant: THE UNIVERSITY OF LIVERPOOL (INCORPORATED IN THE UNITED KINGDOM), Liverpool (GB)

(72) Inventors: Simon Maher, Liverpool (GB); Cedric Claude Boisdon, Liverpool (GB)

(73) Assignee: THE UNIVERSITY OF LIVERPOOL (INC. IN THE UK), Liverpool (GB)

(*) Notice: Subject to any disclaimer, the term of this patent is extended or adjusted under 35 U.S.C. 154(b) by 384 days.

(21) Appl. No.: 16/980,990

(22) PCT Filed: Mar. 15, 2019

(86) PCT No.: PCT/GB2019/050743
§ 371 (c)(1),
(2) Date: Sep. 15, 2020

(87) PCT Pub. No.: WO2019/175604
PCT Pub. Date: Sep. 19, 2019

(65) Prior Publication Data
US 2021/0249243 A1 Aug. 12, 2021

(30) Foreign Application Priority Data
Mar. 16, 2018 (GB) ...................... 1804229
Sep. 11, 2018 (GB) ...................... 1814739

(51) Int. Cl.
*G01N 27/622* (2021.01)
*H01J 49/06* (2006.01)

(52) U.S. Cl.
CPC .......... *G01N 27/622* (2013.01); *H01J 49/062* (2013.01); *H01J 49/065* (2013.01)

(58) Field of Classification Search
CPC ..... G01N 27/622; H01J 49/062; H01J 49/065
(Continued)

(56) References Cited

U.S. PATENT DOCUMENTS 5,280,175 A 1/1994 Karl
5,834,771 A 11/1998 Yoon et al.
(Continued)

FOREIGN PATENT DOCUMENTS

JP 2002015699 A 1/2002
WO 01/93306 A2 12/2001
WO 0201599 A2 1/2002

OTHER PUBLICATIONS

GB Search report dated Aug. 31, 2018 in GB1804229.1.
International Search Report dated May 27, 2019 in PCT/GB2019/050743.

*Primary Examiner* — Kiet T Nguyen
(74) *Attorney, Agent, or Firm* — FOX ROTHSCHILD LLP

(57) ABSTRACT

An ion guide electrode assembly (10) for an ion-mobility spectrometer is described. The electrode assembly (10) comprises a first sheet (100), having first and second surfaces (110, 120) comprising a plurality of corresponding regions (111, 112, 121, 122). The first sheet (100) comprises a set of N electrodes (130, 140), including a first electrode (130) and a second electrode (140), provided as tracks mutually spaced apart on the first surface (110) thereof. The electrode assembly (10) is arrangeable in a planar configuration and preferably in a tubular configuration. In the tubular configuration, a first part (131) of the first electrode (130), provided in a first region 111 of the first surface (110), overlays a second region (122) of the second surface (120). In the tubular configuration, the first part (131) of the first electrode (130) overlaps a second part (132) of the first electrode (130) and/or a second part (142) of the second
(Continued)

electrode (140), provided in a second region (112) of the first surface (110).

20 Claims, 15 Drawing Sheets

(58) Field of Classification Search
USPC .......................................................... 250/292
See application file for complete search history.

(56) References Cited

U.S. PATENT DOCUMENTS

| | | |
|---|---|---|
| 6,369,383 B1 | 4/2002 | Cornish et al. |
| 7,155,812 B1 | 1/2007 | Peterson et al. |
| 8,507,852 B2 | 8/2013 | Makarov |
| 9,324,550 B1 | 4/2016 | Jones |
| 2015/0318156 A1* | 11/2015 | Loyd .................... H01J 49/068 250/281 |

* cited by examiner

ION GUIDE

CROSS REFERENCE TO RELATED APPLICATIONS

This application is a § 371 national phase entry of International Patent Application No. PCT/GB2019/050743, filed Mar. 15, 2019, which claims priority to and the benefit of Great Britain Patent Application No. 1814739.7 filed on Sep. 11, 2018 and Great Britain Patent Application No. 1804229.1 filed on Mar. 16, 2018 disclosures of which are hereby incorporated herein by reference in their entireties.

FIELD

The present invention relates to an ion guide and a method of providing an ion guide.

BACKGROUND TO THE INVENTION

Ion mobility spectrometry (IMS) is an analytical technique used to separate and identify ionized molecules (i.e. ions) in a gas phase based on respective mobilities of the ions therein. Typically, IMS is used in defence, enforcement and security applications, such as for detecting drugs, chemical weapons and/or explosives. IMS is also used in laboratory and industrial analytical applications, including analysis of small and large molecules and cleaning validation. IMS may be coupled (also known as hyphenated) with mass spectrometry (MS), gas chromatography (GC) or high-performance liquid chromatography (HPLC) for multi-dimensional separations. Portability, compactness, robustness, simplicity and/or cost of ion mobility spectrometers may be relevant, particularly for defence, enforcement, security and industrial analytical applications.

A conventional ion mobility spectrometer comprises a drift tube (i.e. an ion guide), comprising a gas (also known as a carrier buffer gas). An electric field is applied along an axial length of the drift tube. Ions are introduced periodically into the drift tube and their respective times to drift (i.e. travel) a given distance, accelerated by the electric field, are measured. The ions may be identified according to their drift times. Increasing homogeneity and/or linearity of the electric field may improve a resolution, for example, of the ion mobility spectrometer.

Typically, a conventional drift tube comprises a stack of alternating electrode, for example metal, and insulator, for example ceramic or plastic, rings. Such a conventional drift tube may be complex and/or costly, due to machining requirements, for example machining tolerances and/or machining of ceramics. Furthermore, such a conventional drift tube may afford restricted portability, compactness and/or robustness, due to a weight, a size and/or an assembly of the stack. For example, a wall thickness of the rings may be relatively large, as required for mechanical stability, increasing weight and size thereof. For example, a frame may be required for assembly of the stack. In addition, a thermal mass of the conventional drift tube may be relatively high, increasing a start-up time of an ion mobility spectrometer.

Another known drift tube uses flex-circuit technology in which every other drift electrode is on a different layer of a flex-circuit and each drift electrode partially overlaps the adjacent electrodes on the other layer. The flex-circuit is multi-layered and double-sided and is rolled into a cylindrical tube to provide this known drift tube. Flexibility of the flex-circuit may be decreased due to the multi-layering and hence a minimum radius of the known drift tube may be relatively large. Furthermore, the flex-circuit may be susceptible to delamination during rolling. In addition, the multi-layered and double-sided flex-circuit may be relatively complex and/or costly.

Hence, there is a need to improve ion guides, for example drift tubes for ion mobility spectrometers.

SUMMARY OF THE INVENTION

It is one aim of the present invention, amongst others, to provide an ion guide and a method of providing such an ion guide which at least partially obviates or mitigates at least some of the disadvantages of the prior art, whether identified herein or elsewhere. For instance, it is an aim of embodiments of the invention to provide an ion guide having a reduced complexity while improving homogeneity and/or linearity of an electric field provided thereby. For instance, it is an aim of embodiments of the invention to provide a method of providing such an ion guide, having a relatively smaller minimum radius while increasing robustness thereof.

A first aspect provides an electrode assembly comprising:
a first sheet, having first and second surfaces comprising a plurality of corresponding regions, comprising a set of N electrodes, including a first electrode and a second electrode, provided as tracks mutually spaced apart on the first surface thereof;
wherein the electrode assembly is arrangeable in:
a planar configuration; and
a tubular configuration:
wherein a first part of the first electrode, provided in a first region of the first surface, overlays a second region of the second surface;
wherein the first part of the first electrode overlaps a second part of the first electrode and/or a second part of the second electrode, provided in a second region of the first surface; and
wherein the electrode assembly provides an ion guide.

A second aspect provides an ion spectrometer comprising an electrode assembly according to the first aspect, wherein the electrode assembly is arranged in the tubular configuration.

A third aspect provides a method of providing an ion guide, the method comprising:
providing on a first sheet, having first and second surfaces comprising a plurality of corresponding regions, a set of N electrodes, including a first electrode and a second electrode, as tracks mutually spaced apart on the first surface thereof, thereby providing an electrode assembly; and
arranging the electrode assembly in a tubular configuration from a planar configuration by overlaying a first part of the first electrode, provided in a first region of the first surface, and a second region of the second surface and overlapping a second part of the first electrode and/or a second part of the second electrode, provided in a second region of the first surface, with the first part of the first electrode; and
where the electrode assembly arranged in the tubular configuration provides the ion guide.

DETAILED DESCRIPTION OF THE INVENTION

According to the present invention there is provided an electrode assembly, an ion spectrometer comprising an electrode assembly and method of providing an ion guide, as set forth in the appended claims. Other features of the invention will be apparent from the dependent claims, and the description that follows.

Electrode Assembly

The first aspect provides an electrode assembly comprising:

a first sheet, having first and second surfaces comprising a plurality of corresponding regions, comprising a set of N electrodes, including a first electrode and a second electrode, provided as tracks mutually spaced apart on the first surface thereof;

wherein the electrode assembly is arrangeable in:

a planar configuration; and a tubular configuration:

wherein a first part of the first electrode, provided in a first region of the first surface, overlays a second region of the second surface;

wherein the first part of the first electrode overlaps a second part of the first electrode and/or a second part of the second electrode, provided in a second region of the first surface; and wherein the electrode assembly provides an ion guide.

In this way, the ion guide has a reduced complexity and/or cost, since the set of N electrodes are provided on the first surface of the first sheet. That is, multi-layering and/or double-siding of the first sheet are not required. In addition, homogeneity and/or linearity of an electric field provided by the ion guide is improved, since the first electrode overlaps the second part of the first electrode and/or the second part of the second electrode, thereby shielding the second part of the first electrode and/or the second part of the second electrode respectively. Further, since the set of N electrodes are provided on the first surface of the first sheet and since the first part of the first electrode overlaps the second part of the first electrode and/or the second part of the second electrode, the number N of electrodes may be increased because connectivity requirements between the N electrodes is reduced. In simple terms, the connectivity requirements may be halved by this overlaying and overlapping and therefore double the number N of electrodes may be accommodated in a given area. Furthermore, a flexibility of the electrode assembly may be improved since the set of N electrodes are provided on the first surface of the first sheet, thereby enabling provision of the ion guide therefrom having a relatively smaller minimum radius without risk of delamination i.e. increasing robustness thereof. It should be understood that the electrode assembly is a flexible electrode assembly.

First Sheet

The electrode assembly comprises the first sheet (also known as a film or membrane), having first and second surfaces comprising the plurality of corresponding regions. It should be understood that the second or lower surface is the reverse of the first surface. For example, the first surface may be known as an upper surface and the second surface may be known as a lower surface. For convenience to aid understanding and without limitation, regions (also known as areas) of the first surface and the second surface are defined, for example by demarcation or division thereof, thereby providing the plurality of corresponding regions. Thus, a first region of the second surface is the reverse of the first region of the first surface. Similarly, the second region of the second surface is the reverse of the second region of the first surface, for example. In one example, the first region of the first surface is adjacent to the second region of the first surface. In one example, the second region is adjacent to a third region of the first surface. Adjacency of other regions may be similar defined.

Generally, the first sheet should be thick enough to provide mechanical support for the tracks. The first sheet should also be thick enough to support a local electric field without dielectric failure. The first sheet should be suitably thin such that the thickness of the first sheet is no more than half that of the tracks. The dielectric and electrode thickness should be thin enough to provide flexibility needed to be shaped in to the tubular configuration. That is to say, the maximum first sheet and electrode thicknesses should be a compromise between flexibility and rigidity for a given tube size, for example diameter.

In one example, the first sheet has a generally quadrilateral shape, for example a square, a rectangle, a parallelogram, a rhombus, a kite or a trapezium. Preferably, the first sheet has a generally rectangular shape or square shape. More preferably, the first sheet has a rectangular shape or a square shape. In one example, a length of the first sheet corresponds with a length of the ion guide. In one example, a width of the first sheet corresponds with at least P perimeters of the ion guide, where P is a natural number $\geq 1$. In one example, an edge of the first sheet defines a datum (also known as a reference line). In one example, an edge of the first sheet is linear, thereby defining a datum. In one example, a region and/or each region of the plurality of corresponding regions has a generally quadrilateral shape, preferably a rectangular shape or a square shape.

In one example, a thickness of the first sheet is in a range from 5 μm to 500 μm, preferably in a range from 10 μm to 250 μm, more preferably in a range from 20 μm to 150 μm, for example, 7.5 μm (0.3 mil), 12.5 μm (0.5 mil), 25 μm (1 mil), 50 μm (2 mil), 75 μm (3 mil), 125 μm (5 mil) or 250 μm (5 mil), wherein the thickness of the first sheet is measured orthogonally to the first surface and/or the second surface. In this way, a flexibility of the electrode assembly may be further improved since the thickness of the first sheet is relatively small.

In one example, the first sheet comprises and/or is a single sheet. In one example, the first sheet comprises a laminate (i.e. a plurality of layers). In one example, the first sheet comprises a single layer (i.e. a homogeneous sheet). In this way, a risk of delamination of the electrode assembly may be further reduced.

It should be understood that the first sheet provides a substrate for the set of N electrodes, including the first electrode and the second electrode, and thus an electrical conductivity of the first sheet is relatively low (i.e. an insulator). In one example, the first sheet comprises or consists of a material having an electrical conductivity of at most $1 \times 10^{-5}$ Sm$^{-1}$, preferably at most $1 \times 10^{-10}$ Sm$^{-1}$, more preferably at most $1 \times 10^{-5}$ Sm$^{-1}$, most preferably at most $1 \times 10^{-5}$ Sm$^{-1}$, measured at 20° C.

In one example, the first sheet comprises or consists of a material having a dielectric strength of at least 100 kVmm$^{-1}$, preferably at least 200 kVmm$^{-1}$, more preferably at least 300 kVmm$^{-1}$. In this way, a risk of electrical breakdown of the ion guide may be reduced and/or the ion guide may be operated at higher electric fields.

In one example, the first sheet comprises or consists of a material having a thermal conductivity of at least 0.01 Wm$^{-1}$K$^{-1}$, preferably at least 0.05 Wm$^{-1}$K$^{-1}$, more preferably at least 0.1 Wm$^{-1}$K$^{-1}$. In this way, thermal equilibration of the electrode assembly may be accelerated, allowing shorter start up times of an ion spectrometer.

In one example, the first sheet comprises or consists of a material having a relative permittivity of at least 2, preferably at least 3, more preferably at least 4. In this way, a capacitance of the ion guide may be increased, thereby further improving the homogeneity and/or the linearity of the electric field provided by the ion guide.

In one example, the first sheet comprises or consists of a polymeric composition comprising a polymer, for example a polyester, a polyimide, a polyamide, polyetherimide, polyaryletherketone and/or fluropolymer. In one example, the polymer is a polyimide for example a thermosetting polyimide such as Kapton® i.e. poly (4,4'-oxydiphenylene-pyromellitimide), Apical®, UPILEX®, VTEC PI®, Norton TH® or Kaptrex®. In one example, the polymer is Teflon® (polytetrafluoroethylene), PEEK (poly ether ether ketone), PEN (polyethylene napthalate) or Ultem® (polyetherimide). Preferably, the polymer is Kapton, for Example Kapton HN, FN, HPP-ST. Kapton is Flexible, has Good Dielectric Properties, Thermal
stability, chemical resistance, mechanical properties and is available as a film. Kapton is suitable for flexible electronics. In one example, the polymeric composition comprises an additive, for example reinforcement such as graphite or glass fibres.

Set of N Electrodes

The electrode assembly comprises the set (also known as an array) of N electrodes, including the first electrode and the second electrode. It should be understood that the set of N electrodes, in use, provide an electric field an axial length of the ion guide due to voltages applied thereto. It should be understood that N is a natural number 2. In one example, the first electrode and the second electrode are adjacent electrodes. For convenience to aid understanding and without limitation, the first electrode may be defined as the first electrode of the set of N electrodes, the second electrode may be defined as the second electrode of the set of N electrodes and the last electrode may be defined as the $N^{th}$ electrode of the set of N electrodes. For convenience to aid understanding and without limitation, parts (also known as lengths) of the first electrode and the second electrode are defined, for example by demarcation or division thereof, corresponding with the regions of the first sheet. Thus, the first part of the first electrode extends over, along or across the first region of the first surface. Similarly, the second part of the first electrode extends over, along or across the second region of the first surface. Other parts of the first electrode and the second electrode may be similarly defined.

In one example, the set of N electrodes includes from 3 to 1000 electrodes, preferably from 10 to 200 electrodes, more preferably from 20 to 100 electrodes including the first electrode and the second electrode. By increasing the number N of electrodes, the homogeneity and/or the linearity of the electric field provided by the ion guide may be further improved.

The set of N electrodes, including the first electrode and the second electrode, are provided as tracks mutually spaced apart on the first surface thereof.

It should be understood that the set of N electrodes, including the first electrode and the second electrode, are solid electrical conductors and thus an electrical conductivity of the tracks is relatively high. In one example, the tracks comprise or consist of a material having an electrical conductivity of at least $1 \times 10^5$ Sm$^{-1}$, preferably at least $1 \times 10^6$ Sm$^{-1}$, more preferably at least $1 \times 10^7$ Sm$^{-1}$, measured at 20° C. In one example, the tracks comprise a material such as a metal, for example Cu, Al, Ag, Au, Ni and/or an alloy thereof and/or a conductive oxide, for example Indium Tin Oxide (ITO).

In one example, the tracks are provided on the first surface, at least in part, by deposition of a material, for example electrodeposition, sputtering, physical vapour deposition, evaporation, spraying, printing and/or adhesion. In one example, the tracks are provided on the first surface, at least in part, by patterning the deposited track material, for example using photolithography. In this way, tracks having relatively complex shapes and/or relatively high tolerances may be readily provided on the first surface.

It should be understood that a track has a length, a width and a thickness.

In one example, a width of a track (i.e. the first electrode and/or the second electrode) is in a range from 0.01 mm to 10 mm, preferably in a range from 0.05 mm to 5 mm, more preferably in a range from 0.25 mm to 2.5 mm, for example 0.5 mm or 1.5 mm. In one example, a width of the track is constant along at least a part of a length thereof, for example the first part of the first electrode and/or the second part of the first electrode. By increasing a number density (i.e. by increasing the number N of electrodes per unit length), the homogeneity and/or the linearity of the electric field provided by the ion guide may be further improved.

In one example, a thickness of a track (i.e. the first electrode and/or the second electrode) is in a range from 5 µm to 500 µm, preferably in a range from 10 µm to 250 µm, more preferably in a range from 20 µm to 150 µm, for example, 7.5 µm, 12.5 µm, 25 µm, 50 µm, 75 µm, 125 µm or 250 µm, wherein the thickness of the track (i.e. the first electrode and/or the second electrode) is measured orthogonally to a surface thereof. In this way, a flexibility of the electrode assembly may be further improved since the thickness of the track (i.e. the first electrode and/or the second electrode) is relatively small.

In one example, the tracks are mutually spaced apart by a gap in a range from 0.01 mm to 10 mm, preferably in a range from 0.05 mm to 5 mm, more preferably in a range from 0.25 mm to 2.5 mm, for example 0.5 mm or 1.5 mm. In one example, the gap is constant along at least a part of a length of the first electrode, for example the first part of the first electrode and/or the second part of the first electrode. By increasing a number density (i.e. by increasing the number N of electrodes per unit length by reducing the gaps therebetween), the homogeneity and/or the linearity of the electric field provided by the ion guide may be further improved.

In one example, the first electrode and the second electrode are mutually equispaced and/or mutually parallel.

In one example, the second part of the first electrode is translated on the first surface with respect to the first part of the first electrode. That is, the second part of the first electrode is laterally offset from the first part of the first electrode, for example by a curved or an angled or a dog leg portion, for example. In one example, the first electrode and/or the second electrode is arranged obliquely on the first sheet. In this way, in the tubular configuration, the first electrode and/or the second electrode defines a helix or a spiral transverse to a longitudinal axis of the electrode assembly.

Generally, the electrode assembly allows a number of dog legs, or similar, to be increased to give more than 2 layers. For subsequent dog legs, a geometry of some or all tracks may be designed to further improve a field gradient by virtue of the electric characteristics of the electrodes in the ion guide, as well as providing shielding. That is, some parts of the electrodes may provide shielding while other parts of the electrodes, for example having different geometries on some or all of the electrodes (e.g., thickness, spacing), may be used to further improve the voltage field gradient linearity and homogeneity.

In one example, the set of N electrodes is provided only on the first surface of the first sheet i.e. such electrodes are not provided on the second surface of the first sheet.

Planar Configuration and Tubular Configuration

The electrode assembly is arrangeable in the planar configuration (i.e. a first configuration) and in the tubular configuration (i.e. a second configuration).

Planar Configuration

In the planar configuration, the electrode assembly is substantially flat, for example the second surface of the first sheet is flat. In this way, providing the set on N electrodes on the first sheet is facilitated.

Tubular Configuration

In the tubular configuration, the first sheet, comprising the set of N electrodes, is arranged for example rolled (also known as reeled, wound, spooled or wrapped) about a longitudinal axis of the tubular configuration. In this way, in the tubular configuration, the electrode assembly has an open-ended hollow shape, thereby defining or forming a passageway for ions. Since the tubular configuration is arranged, for example rolled, about the longitudinal axis of the tubular configuration, various open-ended hollow shapes may be thus provided. In one example, a cross-sectional shape of the electrode assembly is a circle, wherein a radius of the circle is constant along a length of the electrode assembly, whereby the tubular configuration is a cylindrical configuration, thereby providing a round drift tube for example. In this way, the homogeneity and/or the linearity of the electric field provided by the ion guide may be further improved. In one example, a cross-sectional shape of the electrode assembly is a circle, wherein a radius of the circle is decreases linearly along a length of the electrode assembly, whereby the tubular configuration is a frustoconical configuration, thereby providing a frustoconical drift tube for example. In this way, the linearity of the electric field may be controlled. In one example, a cross-sectional shape of the electrode assembly is a rounded rectangle or square (i.e. a rectangle or a square having rounded or curved corners obtained by taking the convex hull of four equal circles of radius r and placing their centers at the four corners of the rectangle or the square) whereby the tubular configuration is a cuboidal configuration, thereby providing a rectangular or a round drift tube for example. In this way, a size of the ion guide may be reduced thereby improving portability and/or compactness.

In one example, in the tubular configuration, the first electrode and/or the second electrode defines a plane transverse and/or orthogonal to a longitudinal axis of the electrode assembly. For example, for a cylindrical configuration, the first electrode is thus arranged circumferentially (i.e. around a circumference). In one example, in the tubular configuration, the first electrode and/or the second electrode defines a helix or a spiral transverse to a longitudinal axis of the electrode assembly.

In one example, the tubular configuration is a cuboidal configuration, wherein the first electrode is arranged circumferentially and wherein a length of the first part of the first electrode corresponds with a perimeter of the cuboidal configuration. The perimeter of a rounded rectangle, having sides of lengths a and b and a corner radius of r, of the cuboidal configuration is given by $2(a+b+\pi_r)$.

In one example, the tubular configuration is a cylindrical configuration, wherein the first electrode is arranged circumferentially and wherein a length of the first part of the first electrode corresponds with a first circumference of the cylindrical configuration. In one example, a length of the second part of the first electrode corresponds with a second circumference of the cylindrical configuration, wherein the first circumference and the second circumference differ by an amount determined by a thickness t of the first sheet, for example by $2\pi t$.

In one example, in the tubular configuration, the first electrode extends around at least P, preferably P, perimeters of the electrode assembly, where P is a natural number $\geq 1$, preferably $\geq 2$, for example 2, 3, 4, 5 or more. In other words, in the tubular configuration, the first electrode may circumscribe about a longitudinal axis of the tubular configuration at least P, preferably P, times. That is, in the tubular configuration, the first electrode may extend around at least $360P°$, preferably $360P°$, about a longitudinal axis of the tubular configuration. It should be understood that by successively overlaying regions of the second surface with corresponding regions of the first surface, for example by repeatedly rolling the first sheet comprising the set of N electrodes, the first electrode may thus define a spiral having successive parts at successively increasing diameters. Hence, a length of the first electrode corresponds with at least P, preferably P, perimeters of the electrode assembly.

In one example, the electrode assembly is arranged to move from the planar configuration to the tubular configuration by rolling (also known as reeling, winding, spooling or wrapping) the first sheet comprising the set of N electrodes.

Overlaying

In the tubular configuration, the first part of the first electrode, provided in the first region of the first surface, overlays the second region of the second surface. That is, a multi-layered structure is provided by arranging the electrode assembly in the tubular configuration, whereby the first part of the first electrode is layered, interleaved, sandwiched or interdisposed between the first sheet. In this way, a multi-layered structure may be provided using the first sheet comprising the set of N electrodes, including a first electrode and a second electrode, provided as tracks mutually spaced apart on the first surface thereof. It should be understood that depending, for example, on an orientation of the tubular configuration, the first part of the first electrode, provided in the first region of the first surface, overlays the second region of the second surface in one orientation and when oriented in a second orientation, underlays the second region of the second surface. Hence, the first part of the first electrode, provided in the first region of the first surface, may be at a relatively larger or smaller distance from a longitudinal axis of the electrode assembly than the second region of the second surface. For the avoidance of doubt, in one example, in the tubular configuration, the first part of the first electrode, provided in the first region of the first surface, overlays the second region of the second surface or the first part of the first electrode, provided in the first region of the first surface, underlays the second region of the second surface. In one example, the first part of the first electrode overlays the second region of the second surface by confronting (i.e. closely spaced, proximal to) the second region of the second surface. In one example, the first part of the first electrode directly overlays the second region of the second surface. In one example, the first part of the first electrode overlays the second region of the second surface by contacting, for example by directly contacting, the second region of the second surface. In one example, the electrode assembly comprises an interlayer (for example, a second sheet) arranged between the first part of the first electrode and the second region of the second surface. The interlayer may be as described with respect to the first sheet.

Overlapping

In the tubular configuration, the first part of the first electrode overlaps the second part of the first electrode and/or the second part of the second electrode, provided in the second region of the first surface. It should be understood that in the tubular configuration, the first part of the first electrode is spaced apart or separated from the second part of the first electrode and/or the second part of the second electrode by at least a thickness of the first sheet. That is, in a cylindrical configuration for example, the first part of the first electrode is at a first radius and the second part of the first electrode is at a second radius, smaller than the first radius by at least the thickness of the first sheet. Hence, in the tubular configuration, the first part of the first electrode at least partially shields or covers the second part of the first electrode and/or the second part of the second electrode through the first sheet. In this way, thereby shielding of the set of N electrodes is improved. For example, if the first part of the first electrode overlaps the second part of the first electrode, intra-electrode shielding or self-shielding of the first electrode is provided. For example, if the first part of the first electrode overlaps the second part of the second electrode, inter-electrode shielding of the second electrode is provided by the first electrode. In one example, the first part of the first electrode overlaps a gap between the second part of the first electrode and the second part of the second electrode. Preferably, the first part of the first electrode overlaps the second part of the first electrode and the second part of the second electrode.

In one example, in the tubular configuration, the first part of the first electrode overlaps the second part of the first electrode by an amount in a range from 5% to 100%, preferably in a range from 10% to 60%, more preferably in a range from 20% to 50% of a width of the first part and/or the second part of the first electrode. In this way, thereby shielding of the set of N electrodes is improved.

In one example, in the tubular configuration, the first part of the first electrode overlaps the second part of the second electrode by an amount in a range from 5% to 100%, preferably in a range from 10% to 60%, more preferably in a range from 20% to 50% of a width of the first part of the first electrode and/or the second part of the second electrode. In this way, thereby shielding of the set of N electrodes is improved.

In one example, in the tubular configuration: the second part of the first electrode overlays a third region of the second surface; and the first part and/or the second part of the first electrode overlaps a third part of the first electrode provided in a third region of the first surface. That is, another layer of shielding is provided. In this way, thereby shielding of the set of N electrodes is improved.

Ion Guide

In the tubular configuration, the electrode assembly provides an ion guide, for example for an ion spectrometer. In one example, the ion guide is a drift tube for an ion mobility spectrometer.

Second Electrode

In one example, in the tubular configuration: a first part of the second electrode provided in the first region of the first surface overlays the second region of the second surface; and the first part of the second electrode overlaps the second part of the first electrode and/or the second part of the second electrode. That is, the second electrode may be similar to as described with respect to the first electrode. More generally, in one example, the N electrodes of the set of N electrodes are according to (i.e. as described with respect to) the first electrode, mutatis mutandis (i.e. making necessary alterations while not affecting the principles of the first electrode).

Components

In one example, the electrode assembly comprises one or more electrical components and/or networks thereof, for example passive electrical components including resistors, capacitors, inductors, transducers, sensors and/or detectors and/or active electrical components including diodes, transistors, and/or integrated circuits, and/or networks thereof, for example mounted on the first surface and/or the second surface. In one example, electrode assembly comprises a first resistor, a Zener diode and/or a second resistor, wherein the first electrode and the second electrode are coupled via the first resistor, the Zener diode and/or the second resistor. In this way, the homogeneity and/or the linearity of the electric field provided by the ion guide may be further improved.

Generally, the electrical components provide a means of voltage increment and stabilisation and may be mounted directly on one surface of the first sheet in such a way as to provide voltage increment through the use of series Zener diodes and voltage filtration through the use of RC filtering of each electrode, where the a resistance R is implemented through the use of resistors and a capacitance C is due to, at least in part, to the tubular configuration. That is, tubular configuration provides part of the Zener voltage stabilisation and filtering system. Particularly, the RC filtering may be comprised of a resistor at the beginning of an electrode and the capacitance is provided by the electrode itself. The capacitance can be relative to a ground electrode on the first sheet or a casing or housing in which the electrode assembly in the tubular configuration is inserted. This allows overall complexity to be reduced. The capacitive coupling may provide noise reduction. Part, or all, of the electronics necessary to provide voltage stabilisation as well as gating and ion detection may be mounted on one surface of the first sheet. For example, for an IMS drift tube, electronic component requirements may be relatively limited and thus, it may be possible that all or part of the electronic components can be mounted on the same first sheet as the one which is used for the drift tube (for example, a part which is not rolled), including a high voltage power supply, voltage regulation using Zener diodes, gating electronics (to drive the an ion gate/shutter, for example a Bradbury-Nielsen type) and an amplifier.

In one example, the first resistor, the Zener diode and/or the second resistor are mounted on the first surface of the first sheet, for example in the first region of the first surface and/or a zeroth region (also known as a flying region) of the first surface adjacent to the first region. In this way, by mounting these electrical components on the first surface, complexity and/or cost may be reduced.

Ground Electrode

In one example, the first sheet comprises a ground electrode provided in a first region of the second surface thereof. In this way, shielding of the electrode assembly may be further improved, whereby the homogeneity and/or the linearity of the electric field provided by the ion guide may be further improved.

Dielectric

In one example, the first surface comprises a fourth region, isolated from the set of N electrodes, wherein the fourth region provides an inner surface of the ion guide.

Housing

In one example, a housing (also known as a casing) is provided for the electrode assembly arranged in the tubular configuration. In this way, a thermal stability of the electrode assembly may be improved. In one example, housing comprises and/or is formed from an electrically and/or thermally insulating material, for example glass and/or a polymeric material, such as a foamed polymeric material, and/or an aerogel.

In one example, the housing comprises a passageway corresponding with the electrode assembly arranged in the tubular configuration, for example a tubular passageway. In one example, an internal diameter of the passageway corresponds with an external diameter of the electrode assembly arranged in the tubular configuration. In one example, a gap is provided between the internal diameter of the passageway and the external diameter of the electrode assembly arranged in the tubular configuration. In one example, the gap is in a range from 0.1 mm to 10 mm, preferably in a range from 1 mm to 5 mm, for example about 3 mm. In one example, the housing comprises a set of spacers arranged to provide the gap. In one example, an outer surface of the electrode assembly arranged in the tubular configuration faces, is proximal to, confronts and/or contacts an inner surface of the passageway. The gap may improve thermal stability of the electrode assembly arranged in the tubular configuration. In use, a temperature within a drift region may be raised uniformly and/or efficiently and/or maintained. A relatively smaller gap results in a reduced temperature overshoot and a reduced settling time. Conversely, a relatively larger gap results in reduced temperature rise time.

In one example, the housing comprises a set of pipes including a first pipe, wherein the first pipe provides the passageway. In one example, the set of pipes includes the first pipe and a second pipe. In one example, the first pipe and the second pipe are arranged coaxially. In one example, a bore of the first pipe, for example an inner pipe, is arranged to receive the electrode assembly, arranged in the tubular configuration, therein. In one example, the first pipe and the second pipe have equal lengths. In one example, an annular gap is provided between the two coaxial pipes. In one example, the annular gap is arranged to receive a thermal insulator therein, for example, a noble gas such as Ar or Xe and/or an aerogel material. In one example, the annular gap is arranged to be evacuated (i.e. a vacuum). In this way, a thermal stability of the electrode assembly may be improved further. In one example, the first pipe and/or the second pipe are formed from an electrically and/or thermally insulating material, for example glass and/or a polymeric material.

In use, drift gas is pre-heated as it passes through the gap between the inner tube (i.e. first pipe) and a desolvation region (which in effect is an ion guide region that is providing heat to remove solvent from charged droplets). The gas picks up heat from this region and further stabilises in terms of its temperature as is passes through the clearance region between the first pipe and the electrode assembly arranged in the tubular configuration. Once the gas reaches the end of the electrode assembly arranged in the tubular configuration, it is thought to be at a constant temperature, and then it is used to perform its intended function as a heated drift gas as it passes back though the central region of the electrode assembly arranged in the tubular configuration. Additionally and/or alternatively, the drift gas may move through the radial gap.

In one example, the housing comprises a heating element, for example in contact with an inner surface of the passageway. In one example, the housing comprises a heating element, for example arranged in the annular gap between the first pipe and the second pipe. Having the heating element within this annular gap helps simplify the construction, since the heating element is at ground potential and having it within the annular gap prevents any arcing from high voltage, for example.

Ion Spectrometer

The second aspect provide an ion spectrometer comprising an electrode assembly according to the first aspect,
wherein the electrode assembly is arranged in the tubular configuration.

In one example, the ion spectrometer comprises a housing for the electrode assembly, as described with respect to the first aspect.

Method

The third aspect provides a method of providing an ion guide, the method comprising:
providing on a first sheet, having first and second surfaces comprising a plurality of corresponding regions, a set of N electrodes, including a first electrode and a second electrode, as tracks mutually spaced apart on the first surface thereof, thereby providing an electrode assembly; and
arranging the electrode assembly in a tubular configuration from a planar configuration by overlaying a first part of the first electrode, provided in a first region of the first surface, and a second region of the second surface and overlapping a second part of the first electrode and/or a second part of the second electrode, provided in a second region of the first surface, with the first part of the first electrode; and
where the electrode assembly arranged in the tubular configuration provides the ion guide.

The first sheet, the first surface, the second surface, the plurality of corresponding regions, the set of N electrodes, the first electrode, the second electrode, the electrode assembly, the tubular configuration, the planar configuration, the first part of the first electrode, the second part of the first electrode, the second part of the second electrode and/or the ion guide may be as described with respect to the first aspect and/or the second aspect.

Providing Electrodes

The method comprises providing on the first sheet the set of N electrodes as tracks on the first surface thereof.

In one example, the tracks are provided on the first surface, at least in part, by deposition of a material, for example electrodeposition, sputtering, physical vapour deposition, evaporation, spraying, printing and/or adhesion. In one example, the tracks are provided on the first surface, at least in part, by patterning the deposited track material, for example using photolithography. In this way, tracks having relatively complex shapes and/or relatively high tolerances may be readily provided on the first surface.

Arranging the Tubular Configuration

The method comprises arranging the electrode assembly in the tubular configuration from the planar configuration.

In one example, arranging the electrode assembly in the tubular configuration is by rolling (also known as reeling, winding, spooling or wrapping) the first sheet comprising the set of N electrodes into a cylindrical configuration, whereby the first electrode is arranged circumferentially and wherein a length of the first part of the first electrode corresponds with a first circumference of the cylindrical configuration.

Components

In one example, the method comprises coupling the first electrode and the second electrode via a first resistor, a Zener diode and a second resistor, before arranging the electrode assembly in the tubular configuration.

Ground Electrode

In one example, the method comprises providing a ground electrode provided in a first region of the second surface, before arranging the electrode assembly in the tubular configuration.

Definitions & Combinations of Features

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention, such as colourants, and the like.

The term "consisting of" or "consists of" means including the components specified but excluding other components.

Whenever appropriate, depending upon the context, the use of the term "comprises" or "comprising" may also be taken to include the meaning "consists essentially of" or "consisting essentially of", and also may also be taken to include the meaning "consists of" or "consisting of".

The optional features set out herein may be used either individually or in combination with each other where appropriate and particularly in the combinations as set out in the accompanying claims. The optional features for each aspect or exemplary embodiment of the invention, as set out herein are also applicable to all other aspects or exemplary embodiments of the invention, where appropriate. In other words, the skilled person reading this specification should consider the optional features for each aspect or exemplary embodiment of the invention as interchangeable and combinable between different aspects and exemplary embodiments.

BRIEF DESCRIPTION OF THE DRAWINGS

For a better understanding of the invention, and to show how exemplary embodiments of the same may be brought into effect, reference will be made, by way of example only, to the accompanying diagrammatic Figures, in which.

DETAILED DESCRIPTION OF THE DRAWINGS

Generally, like reference signs indicate like features.

Figure 1:
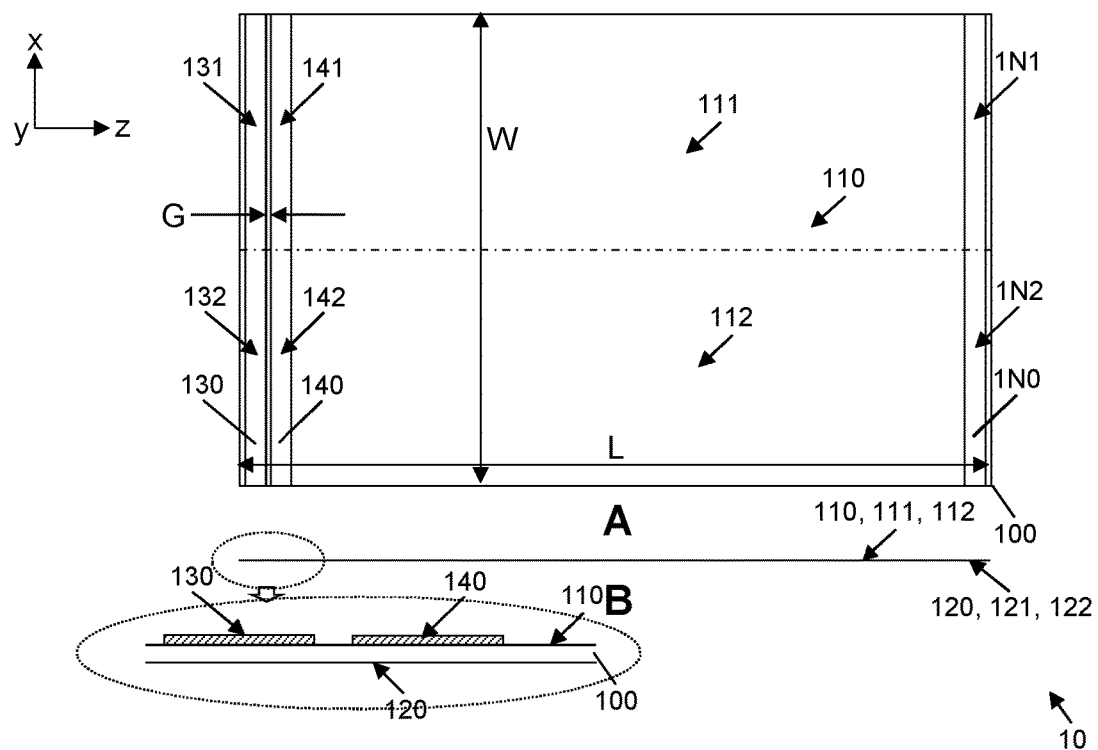
FIGS. 1A to 1B schematically depict an electrode assembly according to an exemplary embodiment, in a planar configuration.

FIGS. 1A to 1B schematically depict an electrode assembly 10 according to an exemplary embodiment, in a planar configuration. Particularly, FIG. 1A shows a plan view of the electrode assembly 10 in the planar configuration and FIG. 2B shows a cross-section in the y-z plane of the electrode assembly 10 in the planar configuration, including a portion in more detail.

Figure 2:
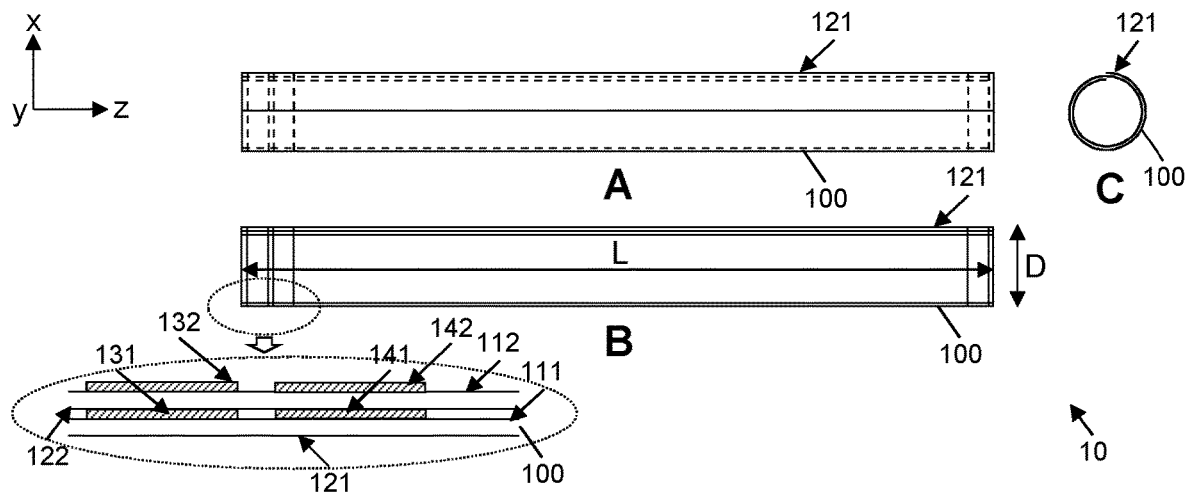
FIGS. 2A to 2C schematically depict the electrode assembly of FIGS. 1A to 1B, in a tubular configuration.

FIGS. 2A to 2C schematically depict the electrode assembly 10 of FIGS. 1A to 1B, in a tubular configuration. Particularly, FIG. 2A shows a plan view of the electrode assembly 10 in the tubular configuration, FIG. 2B shows a cross-section in the y-z plane of the electrode assembly 10 in the tubular configuration, including a portion in more detail, and FIG. 2B shows a cross-section in the x-y plane of the electrode assembly 10 in the tubular configuration.

The electrode assembly 10 comprises a first sheet 100, having first and second surfaces 110, 120 comprising a plurality of corresponding regions 111, 112, 121, 122. The first sheet 100 comprises a set of N electrodes 130, 140, including a first electrode 130 and a second electrode 140, provided as tracks mutually spaced apart on the first surface 110 thereof. The electrode assembly 10 is arrangeable in the planar configuration (FIGS. 1A to 1B) and the tubular configuration (FIGS. 2A to 2C). In the tubular configuration, a first part 131 of the first electrode 130, provided in a first region 111 of the first surface 110, overlays a second region 122 of the second surface 120. In the tubular configuration, the first part 131 of the first electrode 130 overlaps a second part 132 of the first electrode 130 and/or a second part 142 of the second electrode 140, provided in a second region 112 of the first surface 110. In the tubular configuration, the electrode assembly 10 provides an ion guide.

In this way, the ion guide has a reduced complexity and/or cost, since the set of N electrodes are provided on the first surface 110 of the first sheet 100. That is, multi-layering and/or double-siding of the first sheet 100 are not required. In addition, homogeneity and/or linearity of an electric field provided by the ion guide is improved, since the first electrode 130 overlaps the second part 132 of the first electrode 130 and/or the second part 142 of the second electrode 140, thereby shielding the second part 132 of the first electrode 130 and/or the second part 142 of the second electrode 140 respectively. Furthermore, a flexibility of the electrode assembly 10 may be improved since the set of N electrodes are provided on the first surface 110 of the first sheet 100, thereby enabling provision of the ion guide therefrom having a relatively smaller minimum radius without risk of delamination i.e. increasing robustness thereof.

First Sheet

In this example, the first sheet 100 has a rectangular shape. In this example, a length L of the first sheet 100 corresponds with a length L of the ion guide. In this example, a width W of the first sheet 100 corresponds with 2 perimeters of the ion guide, (i.e. P perimeters of the ion guide where P is a natural number ≤1), having a diameter D. In this example, an edge 101 of the first sheet 100 is linear, thereby defining a datum. In this example, each region 111, 112, 121, 122 of the plurality of corresponding regions has a rectangular shape. Generally, boundaries between regions are shown as dash dot lines.

In this example, a thickness of the first sheet 100 is 75 μm. In this example, the first sheet 100 comprises and/or is a single sheet. In this example, the first sheet 100 comprises a single layer (i.e. a homogeneous sheet). In this example, the first sheet 100 is a Kapton film.

Set of N Electrodes

The first sheet 100 comprises the set of N electrodes 130, 140, including the first electrode 130 and the second electrode 140, provided as tracks mutually spaced apart on the first surface 110 thereof. The set of N electrodes also includes an Nth electrode 1N0. In this example, the first electrode 130 and the second electrode 140 are adjacent electrodes. The first part 131 of the first electrode 130 extends over, along or across the first region 111 of the first surface 110. Similarly, the second part 132 of the first electrode 130 extends over, along or across the second region 112 of the first surface 110. Other parts of the first electrode 130, the second electrode 140 and the Nth electrode 1N0 may be similarly defined.

In this example, the set of N electrodes includes from 3 to 1000 electrodes, preferably from 10 to 200 electrodes, more preferably from 20 to 100 electrodes including the first electrode 130 and the second electrode 140. By increasing the number N of electrodes, the homogeneity and/or the linearity of the electric field provided by the ion guide may be further improved.

In this example, the tracks are formed from Cu. In this example, a width of a track 1.5 mm. In this example, the width of the track is constant along the first part 131 of the first electrode 130 and the second part 132 of the first electrode 130. In this example, a thickness of the tracks is 75 μm. In this example, the tracks are mutually spaced apart by a gap G of 0.5 mm. In this example, the gap is constant along the first part 131 of the first electrode 130 and the second part 132 of the first electrode 130. In this example, the first electrode 130 and the second electrode 140 are mutually equispaced and/or mutually parallel.

In this example, the set of N electrodes is provided only on the first surface 110 of the first sheet 100 i.e. such electrodes are not provided on the second surface 120 of the first sheet 100.

Planar Configuration

In the planar configuration, the electrode assembly 10 is substantially flat, particularly the second surface 120 of the first sheet 100 is flat. In this way, providing the set on N electrodes on the first sheet 100 is facilitated.

Tubular Configuration

In the tubular configuration, the first sheet 100, comprising the set of N electrodes, is arranged for example rolled (also known as reeled, wound, spooled or wrapped) about a longitudinal axis of the tubular configuration. In this way, in the tubular configuration, the electrode assembly 10 has an open-ended hollow shape, thereby defining or forming a passageway for ions. In this example, a cross-sectional shape of the electrode assembly 10 is a circle, wherein a radius of the circle is constant along a length of the electrode assembly 10, whereby the tubular configuration is a cylindrical configuration, thereby providing a round drift tube for example. In this way, the homogeneity and/or the linearity of the electric field provided by the ion guide may be further improved. In this example, in the tubular configuration, the first electrode 130 and the second electrode 140 define planes orthogonal to the longitudinal axis of the electrode assembly 10. i.e. the first electrode 130 and the second electrode 140 are arranged circumferentially (i.e. around a circumference). In this example, the tubular configuration is a cylindrical configuration, wherein the first electrode 130 is arranged circumferentially and wherein a length of the first part 131 of the first electrode 130 corresponds with a first circumference of the cylindrical configuration. In this example, a length of the second part 132 of the first electrode 130 corresponds with a second circumference of the cylindrical configuration, wherein the first circumference and the second circumference differ by an amount determined by a thickness t of the first sheet 100, for example by $2\pi t$. In this example, in the tubular configuration, the first electrode 130 extends around 2 perimeters of the electrode assembly 10 (i.e. P perimeters where P is a natural number ≥1). That is, in the tubular configuration, the first electrode 130 extends around 720°, about the longitudinal axis of the tubular configuration.

In this example, the electrode assembly 10 is arranged to move from the planar configuration to the tubular configuration by rolling (also known as reeling, winding, spooling or wrapping) the first sheet 100 comprising the set of N electrodes.

Overlaying

In the tubular configuration, the first part 131 of the first electrode 130, provided in the first region 111 of the first surface 110, overlays the second region 122 of the second surface 120. That is, a multi-layered structure is provided by arranging the electrode assembly 10 in the tubular configuration, whereby the first part 131 of the first electrode 130 is layered, interleaved, sandwiched or interdisposed between the first sheet 100. In this way, a multi-layered structure may be provided using the first sheet 100 comprising the set of N electrodes, including a first electrode 130 and a second electrode 140, provided as tracks mutually spaced apart on the first surface 110 thereof. In this example, the first part 131 of the first electrode 130 directly overlays the second region 122 of the second surface 120. In this example, the first part 131 of the first electrode 130 overlays the second region 122 of the second surface 120 by contacting, for example by directly contacting, the second region 122 of the second surface 120.

Overlapping

In the tubular configuration, the first part 131 of the first electrode 130 overlaps the second part 132 of the first electrode 130, provided in the second region 112 of the first surface 110. Hence, in the tubular configuration, the first part 131 of the first electrode 130 at least partially shields or covers the second part 132 of the first electrode 130 through the first sheet 100. In this way, thereby shielding of the set of N electrodes is improved.

In this example, in the tubular configuration, the first part 131 of the first electrode 130 overlaps the second part 132 of the first electrode 130 by 100% of the width of the first part 131 of the first electrode 130.

Second Electrode

In this example, in the tubular configuration: a first part 141 of the second electrode 140 provided in the first region 111 of the first surface 110 overlays the second region 122 of the second surface 120; and the first part 141 of the second electrode 140 overlaps the second part 142 of the second electrode 140. That is, the second electrode 140 may be similar to as described with respect to the first electrode 130. More generally, in this example, the N electrodes of the set of N electrodes are according to (i.e. as described with respect to) the first electrode 130, mutatis mutandis (i.e. making necessary alterations while not affecting the principles of the first electrode 130).

Figure 3:
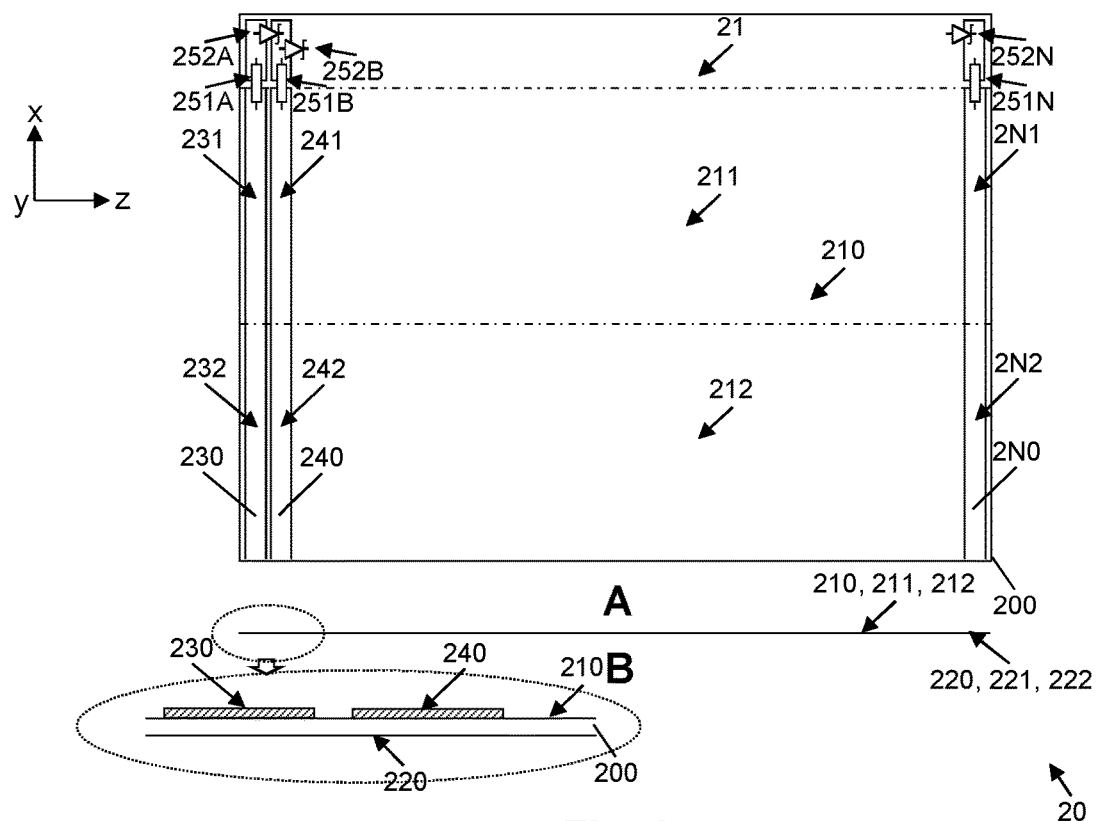
FIGS. 3A to 3B schematically depict an electrode assembly according to an exemplary embodiment, in a planar configuration.

FIGS. 3A to 3B schematically depict an electrode assembly 20 according to an exemplary embodiment, in a planar configuration. Particularly, FIG. 3A shows a plan view of the electrode assembly 20 in the planar configuration and FIG. 3B shows a cross-section in the y-z plane of the electrode assembly 20 in the planar configuration, including a portion in more detail.

Figure 4:
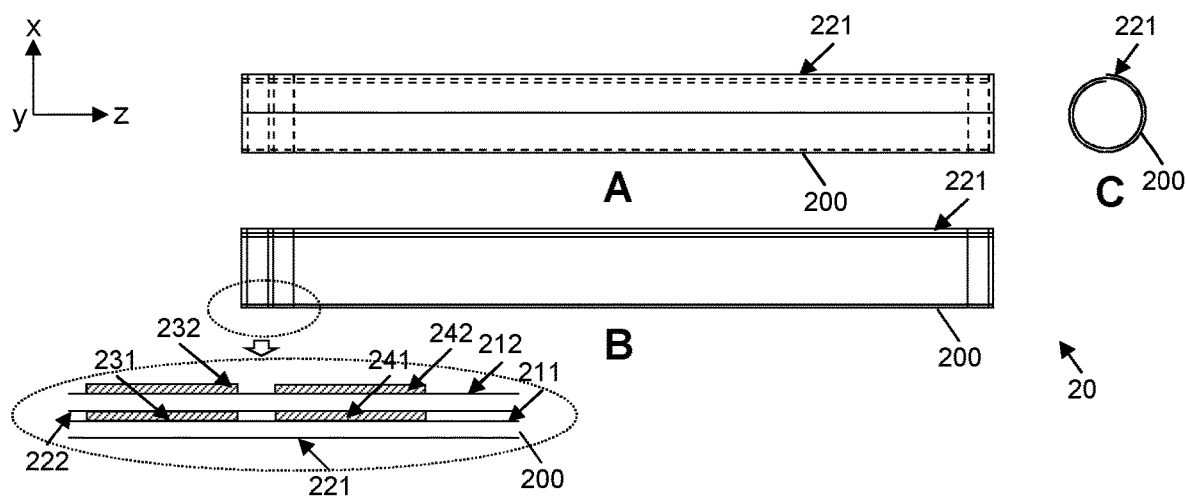
FIGS. 4A to 4C schematically depict the electrode assembly of FIGS. 3A to 3B, in a tubular configuration.

FIGS. 4A to 4C schematically depict the electrode assembly 20 of FIGS. 3A to 3B, in a tubular configuration. Particularly, FIG. 4A shows a plan view of the electrode assembly 20 in the tubular configuration, FIG. 4B shows a cross-section in the y-z plane of the electrode assembly 20 in the tubular configuration, including a portion in more detail, and FIG. 4C shows a cross-section in the x-y plane of the electrode assembly 20 in the tubular configuration.

The electrode assembly 20 comprises a first sheet 200, having first and second surfaces 210, 220 comprising a plurality of corresponding regions 211, 212, 221, 222. The first sheet 200 comprises a set of N electrodes 230, 240, including a first electrode 230 and a second electrode 240, provided as tracks mutually spaced apart on the first surface 210 thereof. The electrode assembly 20 is arrangeable in the planar configuration (FIGS. 3A to 3B) and the tubular configuration (FIGS. 4A to 4C). In the tubular configuration, a first part 231 of the first electrode 230, provided in a first region 211 of the first surface 210, overlays a second region 222 of the second surface 220. In the tubular configuration, the first part 231 of the first electrode 230 overlaps a second part 232 of the first electrode 230, provided in a second region 212 of the first surface 210. In the tubular configuration, the electrode assembly 20 provides an ion guide.

Otherwise as described below, the electrode assembly 20 is as described with respect to the electrode assembly 10. That is, for brevity, description of like features is not repeated.

Components

In this example, the electrode assembly 20 comprises one or more electrical components 251, 252, for example mounted on the first surface and/or the second surface. In this example, electrode assembly 20 comprises a first resistor 251A, a Zener diode 252A and a second resistor 251B, wherein the first electrode 230 and the second electrode 240 are coupled via the first resistor 251A, the Zener diode 252A and/or the second resistor 251B. In this way, the homogeneity and/or the linearity of the electric field provided by the ion guide may be further improved. Also shown is an Nth resistor 251N, and second and Nth Zener diodes 252N, 252N, respectively.

In this example, the first resistor 251A, the Zener diode 252A and the second resistor 252B are mounted on the first surface 210 of the first sheet 200, in a zeroth region 21 (also known as a flying region) of the first surface 210 adjacent to the first region 211. In this way, by mounting these electrical components on the first surface 210, complexity and/or cost may be reduced.

Figure 5:
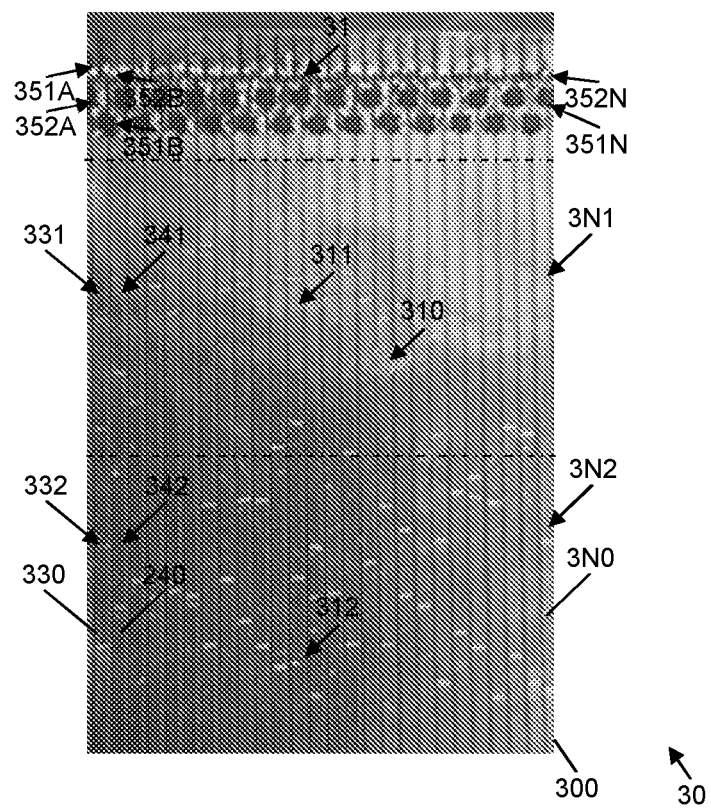
FIG. 5 schematically depicts an electrode assembly according to an exemplary embodiment, in a planar configuration.

FIG. 5 schematically depicts an electrode assembly 30 according to an exemplary embodiment, in a planar configuration. Particularly, FIG. 5 shows a photograph of a plan view of the electrode assembly 30 in the planar configuration. The electrode assembly 30 is generally as described with respect to the electrode assembly 20.

Figure 6:
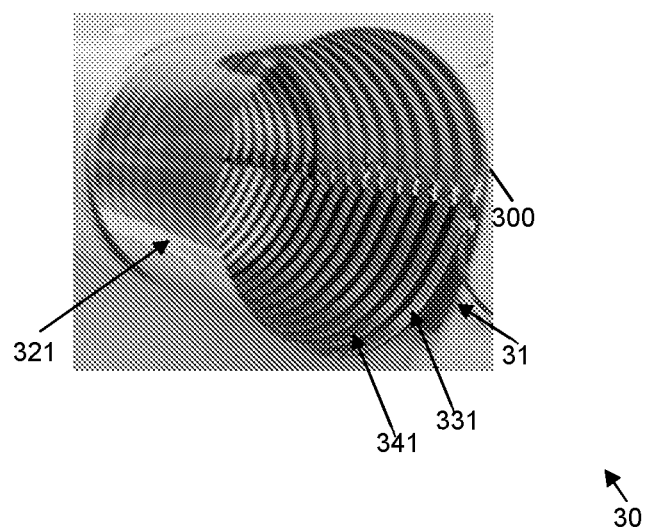
FIG. 6 schematically depicts the electrode assembly of FIG. 5, in a tubular configuration.

FIG. 6 schematically depicts the electrode assembly of FIG. 5, in a tubular configuration. Particularly, FIG. 6 shows a photograph of a perspective view of the electrode configuration in the tubular configuration.

The electrode assembly 30 comprises a first sheet 300, having first and second surfaces 310, 320 comprising a plurality of corresponding regions 311, 312, 321, 322. The first sheet 300 comprises a set of N electrodes 330, 340, including a first electrode 330 and a second electrode 340, provided as tracks mutually spaced apart on the first surface 310 thereof. The electrode assembly 30 is arrangeable in the planar configuration (FIG. 5) and the tubular configuration (FIG. 6). In the tubular configuration, a first part 331 of the first electrode 330, provided in a first region 311 of the first surface 310, overlays a second region 322 of the second surface 320. In the tubular configuration, the first part 331 of the first electrode 330 overlaps a second part 332 of the first electrode 330, provided in a second region 312 of the first surface 310. In the tubular configuration, the electrode assembly 30 provides an ion guide.

Otherwise as described below, the electrode assembly 30 is as described with respect to the electrode assembly 20. That is, for brevity, description of like features is not repeated.

Figure 7:
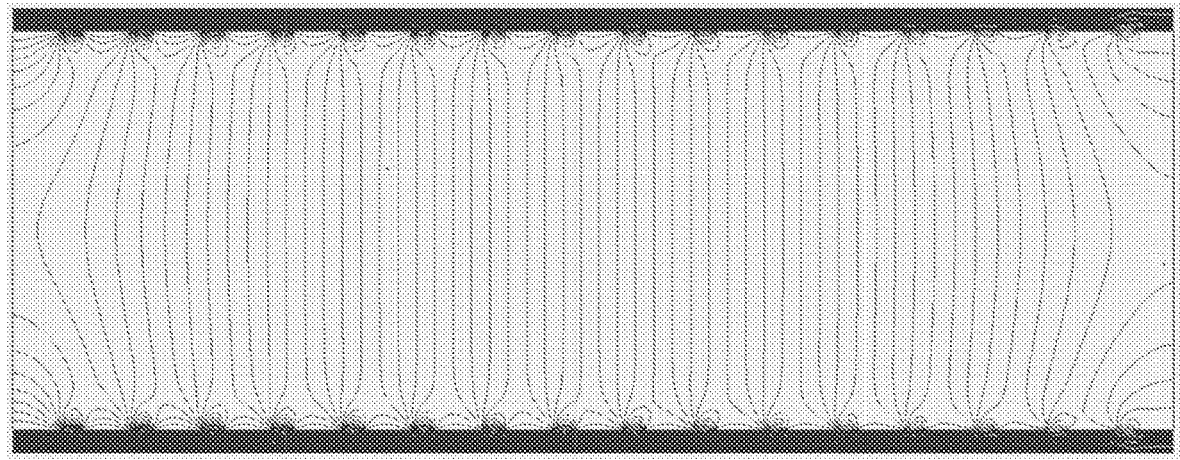
FIG. 7 schematically depicts a simulation of a conventional electrode assembly, in a tubular configuration.

FIG. 7 schematically depicts a simulation of a conventional electrode assembly, in a tubular configuration. Particularly, FIG. 7 shows a cross-section in the y-z plane of the SIMION (RTM) (available from Scientific Instrument Services, Inc., USA) of the conventional electrode assembly arranged to provide a drift tube (i.e. an ion guide). As can be seen from the field lines, inhomogeneity and non-linearity of the electric field provided by the drift tube are apparent.

Figure 8:
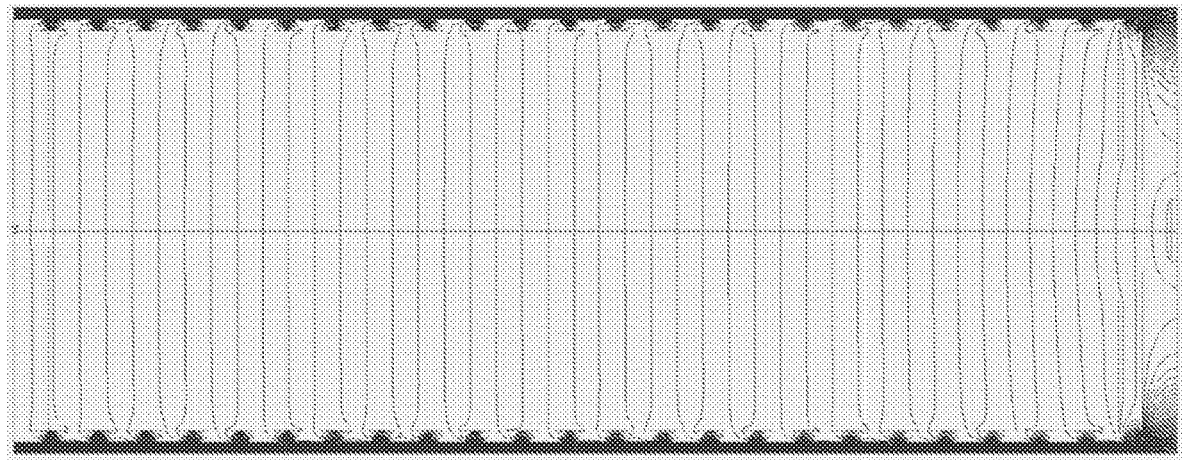
FIG. 8 schematically depicts a simulation of an electrode assembly according to an exemplary embodiment, in a tubular configuration.

FIG. 8 schematically depicts a simulation of an electrode assembly according to an exemplary embodiment, in a tubular configuration. Particularly, FIG. 8 shows a cross-section in the y-z plane of the SIMION (RTM) (available from Scientific Instrument Services, Inc., USA) of the electrode assembly arranged to provide a drift tube (i.e. an ion guide), in which electrodes self-overlap by 25%, similar to an electrode assembly 40 described below. As can be seen from the field lines, homogeneity and linearity of the electric field provided by the drift tube is improved compared with FIG. 8.

FIGS. 9A to 9B schematically depict an electrode assembly 40 according to an exemplary embodiment, in a planar configuration. Particularly, FIG. 9A shows a plan view of the electrode assembly 40 in the planar configuration and FIG. 9B shows a cross-section in the y-z plane of the electrode assembly 40 in the planar configuration, including a portion in more detail.

Figure 9:
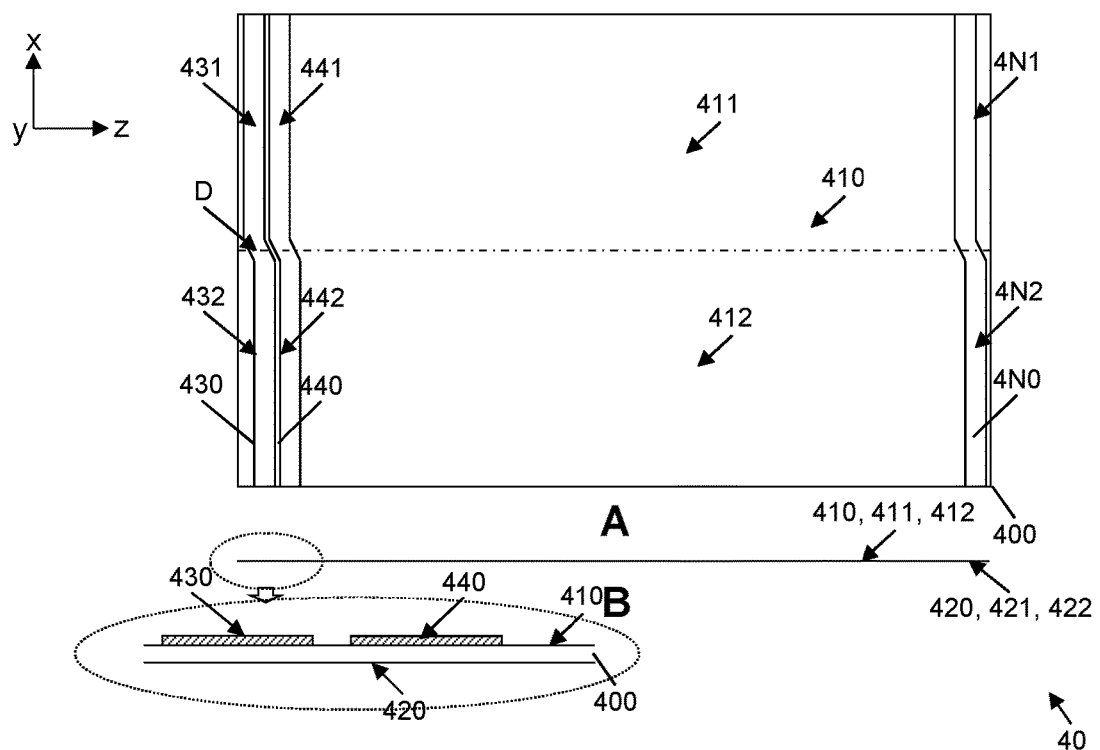
FIGS. 9A to 9B schematically depict an electrode assembly according to an exemplary embodiment, in a planar configuration.
Figure 10:
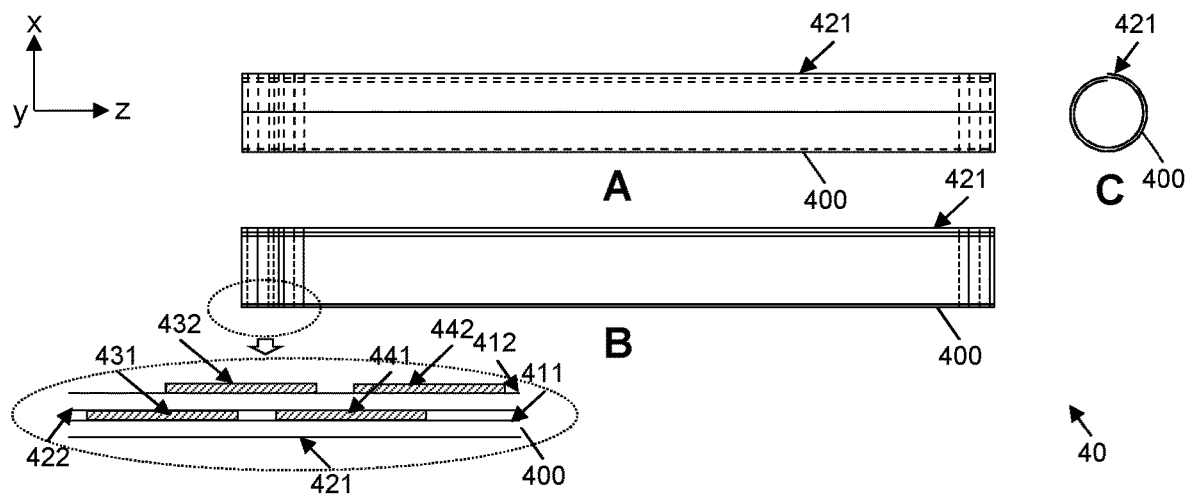
FIGS. 10A to 10C schematically depict the electrode assembly of FIGS. 9A to 9B, in a tubular configuration.

FIGS. 10A to 10C schematically depict the electrode assembly 40 of FIGS. 9A to 9B, in a tubular configuration. Particularly, FIG. 10A shows a plan view of the electrode assembly 40 in the tubular configuration, FIG. 10B shows a cross-section in the y-z plane of the electrode assembly 40 in the tubular configuration, including a portion in more detail, and FIG. 10C shows a cross-section in the x-y plane of the electrode assembly 40 in the tubular configuration.

The electrode assembly 40 comprises a first sheet 400, having first and second surfaces 410, 420 comprising a plurality of corresponding regions 411, 412, 421, 422. The first sheet 400 comprises a set of N electrodes 430, 440, including a first electrode 430 and a second electrode 440, provided as tracks mutually spaced apart on the first surface 410 thereof. The electrode assembly 40 is arrangeable in the planar configuration (FIGS. 3A to 3B) and the tubular configuration (FIGS. 4A to 4C). In the tubular configuration, a first part 431 of the first electrode 430, provided in a first region 411 of the first surface 410, overlays a second region 422 of the second surface 420. In the tubular configuration, the first part 431 of the first electrode 430 overlaps a second part 432 of the first electrode 430 and a second part 442 of the second electrode 440, provided in a second region 412 of the first surface 410. In the tubular configuration, the electrode assembly 40 provides an ion guide.

Otherwise as described below, the electrode assembly 40 is as described with respect to the electrode assembly 10. That is, for brevity, description of like features is not repeated.

Electrodes

In this example, the second part 432 of the first electrode 430 is translated on the first surface 410 with respect to the first part 431 of the first electrode 430. That is, the second part 432 of the first electrode 430 is laterally offset from the first part 431 of the first electrode 430 by a dog leg portion.

Overlapping

In the tubular configuration, the first part 431 of the first electrode 430 overlaps the second part 432 of the first electrode 430 and the second part 442 of the second electrode 440, provided in the second region 412 of the first surface 410. Hence, in the tubular configuration, the first part 431 of the first electrode 430 at least partially shields or covers the second part 432 of the first electrode 430 and/or the second part 442 of the second electrode 440 through the first sheet 400. In this way, thereby shielding of the set of N electrodes is improved. For example, if the first part 431 of the first electrode 430 overlaps the second part 432 of the first electrode 430, intra-electrode shielding or self-shielding of the first electrode 430 is provided. For example, if the first part 431 of the first electrode 430 overlaps the second part 442 of the second electrode 440, inter-electrode shielding of the second electrode 440 is provided by the first electrode 430. In this example, the first part 431 of the first electrode 430 overlaps a gap between the second part 432 of the first electrode 430 and the second part 442 of the second electrode 440. Preferably, the first part 431 of the first electrode 430 overlaps the second part 432 of the first electrode 430 and the second part 442 of the second electrode 440.

In this example, in the tubular configuration, the first part 431 of the first electrode 430 overlaps the second part 432 of the first electrode 430 by 50% of the width of the first part 431 of the first electrode 430.

In this example, in the tubular configuration, the first part 431 of the first electrode 430 overlaps the second part 442 of the second electrode 440 by about 40% of the width of the first part 431 of the first electrode 430.

In this example, in the tubular configuration, the first part 431 of the first electrode 430 overlaps a gap between the second part 432 of the first electrode 430 and the second part 442 of the second electrode 440.

Figure 11:
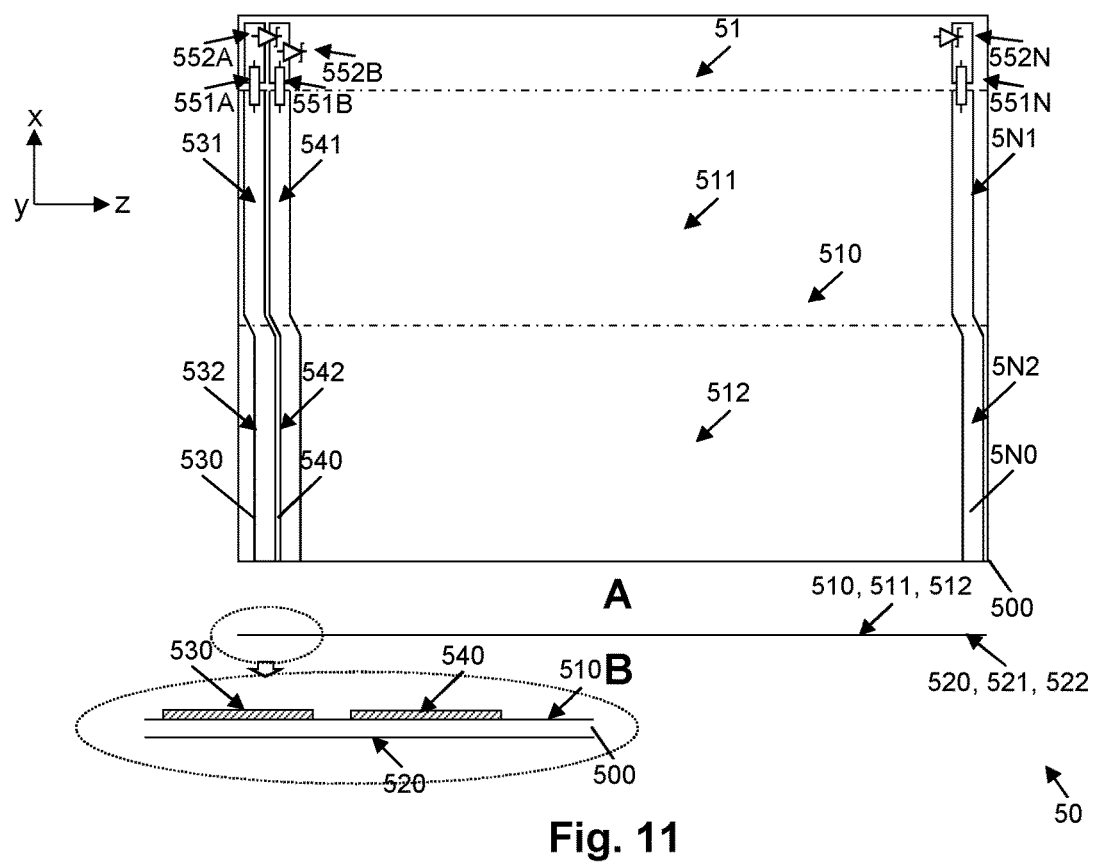
FIGS. 11A to 11B schematically depict an electrode assembly according to an exemplary embodiment, in a planar configuration.

FIGS. 11A to 11B schematically depict an electrode assembly 50 according to an exemplary embodiment, in a planar configuration. Particularly, FIG. 11A shows a plan view of the electrode assembly 50 in the planar configuration and FIG. 11B shows a cross-section in the y-z plane of the electrode assembly 50 in the planar configuration, including a portion in more detail.

Figure 12:
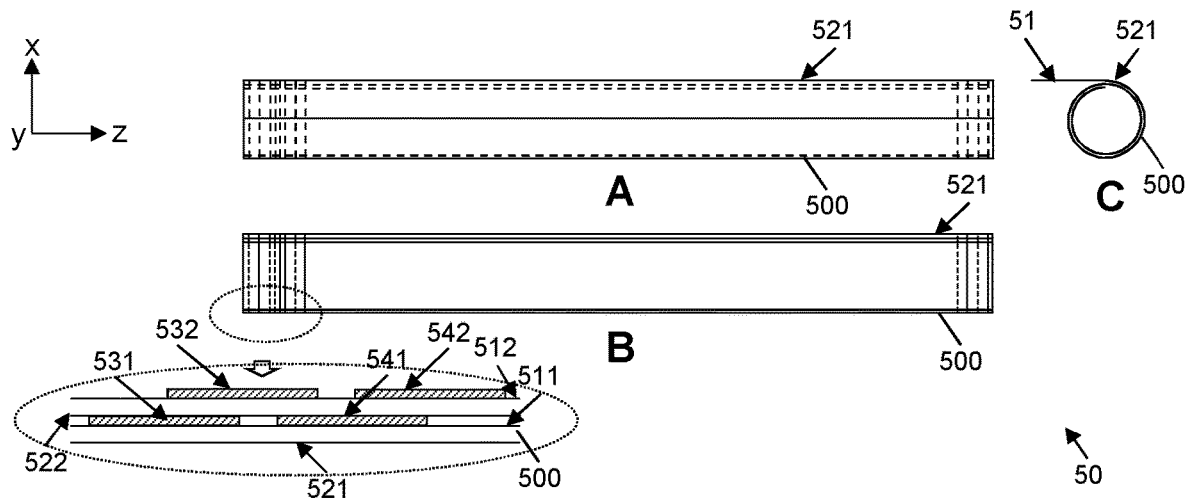
FIGS. 12A to 12C schematically depict the electrode assembly of FIGS. 11A to 11B, in a tubular configuration.

FIGS. 12A to 12C schematically depict the electrode assembly 50 of FIGS. 11A to 11B, in a tubular configuration. Particularly, FIG. 12A shows a plan view of the electrode assembly 50 in the tubular configuration, FIG. 12B shows a cross-section in the y-z plane of the electrode assembly 50 in the tubular configuration, including a portion in more detail, and FIG. 12C shows a cross-section in the x-y plane of the electrode assembly 50 in the tubular configuration.

The electrode assembly 50 comprises a first sheet 500, having first and second surfaces 510, 520 comprising a plurality of corresponding regions 511, 512, 521, 522. The first sheet 500 comprises a set of N electrodes 530, 540, including a first electrode 530 and a second electrode 540, provided as tracks mutually spaced apart on the first surface 510 thereof. The electrode assembly 50 is arrangeable in the planar configuration (FIGS. 3A to 3B) and the tubular configuration (FIGS. 5A to 5C). In the tubular configuration, a first part 531 of the first electrode 530, provided in a first region 511 of the first surface 510, overlays a second region 522 of the second surface 520. In the tubular configuration, the first part 531 of the first electrode 530 overlaps a second part 532 of the first electrode 530 and a second part 542 of the second electrode 540, provided in a second region 512 of the first surface 510. In the tubular configuration, the electrode assembly 50 provides an ion guide.

Otherwise as described below, the electrode assembly 50 is as described with respect to the electrode assembly 40. That is, for brevity, description of like features is not repeated.

Components

In this example, the electrode assembly 50 comprises one or more electrical components 551, 552, for example mounted on the first surface and/or the second surface. In this example, electrode assembly 50 comprises a first resistor 551A, a Zener diode 552A and a second resistor 551B, wherein the first electrode 530 and the second electrode 540 are coupled via the first resistor 551A, the Zener diode 552A and/or the second resistor 551B. In this way, the homogeneity and/or the linearity of the electric field provided by the ion guide may be further improved. Also shown is an Nth resistor 551N, and second and Nth Zener diodes 552N, 552N, respectively.

In this example, the first resistor 551A, the Zener diode 552A and the second resistor 552B are mounted on the first surface 510 of the first sheet 500, in a zeroth region 51 (also known as a flying region) of the first surface 510 adjacent to the first region 511. In this way, by mounting these electrical components on the first surface 510, complexity and/or cost may be reduced.

Figure 13:
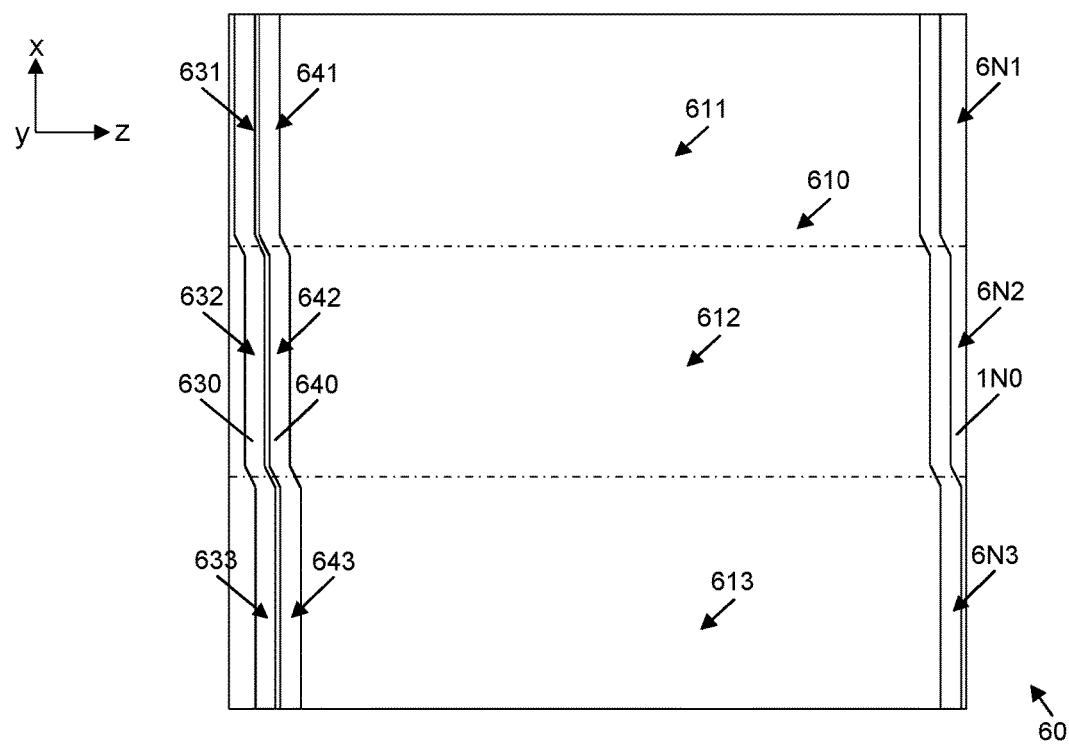
FIG. 13 schematically depicts an electrode assembly according to an exemplary embodiment, in a planar configuration.

FIG. 13 schematically depicts an electrode assembly 60 according to an exemplary embodiment, in a planar configuration. Particularly, FIG. 13 shows a plan view of the electrode assembly 60 in the planar configuration. A cross-section in the y-z plane of the electrode assembly 60 in the planar configuration is as described with respect to the electrode assembly 40 in the planar configuration.

Figure 14:
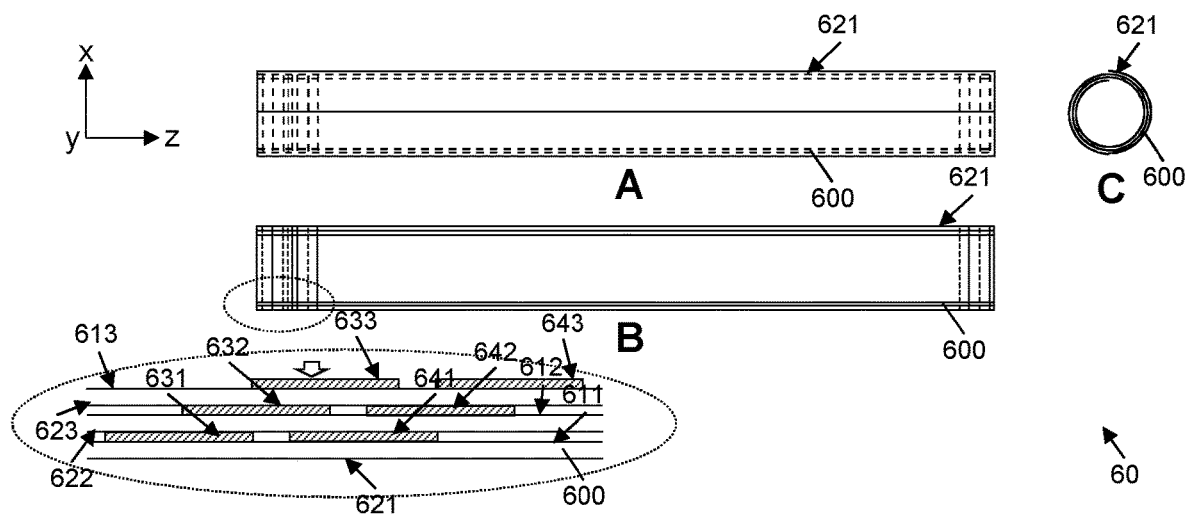
FIGS. 14A to 14C schematically depict the electrode assembly of FIG. 13, in a tubular configuration.

FIGS. 14A to 14C schematically depict the electrode assembly 60 of FIG. 13, in a tubular configuration. Particularly, FIG. 14A shows a plan view of the electrode assembly 60 in the tubular configuration, FIG. 14B shows a cross-section in the y-z plane of the electrode assembly 60 in the tubular configuration, including a portion in more detail, and FIG. 14C shows a cross-section in the x-y plane of the electrode assembly 60 in the tubular configuration.

The electrode assembly 60 comprises a first sheet 600, having first and second surfaces 610, 620 comprising a plurality of corresponding regions 611, 612, 621, 622. The first sheet 600 comprises a set of N electrodes 630, 640, including a first electrode 630 and a second electrode 640, provided as tracks mutually spaced apart on the first surface 610 thereof. The electrode assembly 60 is arrangeable in the planar configuration (FIG. 13) and the tubular configuration (FIGS. 14A to 14C). In the tubular configuration, a first part 631 of the first electrode 630, provided in a first region 611 of the first surface 610, overlays a second region 622 of the second surface 620. In the tubular configuration, the first part 631 of the first electrode 630 overlaps a second part 632 of the first electrode 630 and a second part 642 of the second electrode 640, provided in a second region 612 of the first surface 610. In the tubular configuration, the electrode assembly 60 provides an ion guide.

Otherwise as described below, the electrode assembly 60 is as described with respect to the electrode assembly 40. That is, for brevity, description of like features is not repeated.

In this example, in the tubular configuration: the second part 632 of the first electrode 630 overlays a third region of the second surface 620; and the first part and/or the second part 632 of the first electrode 630 overlaps a third part 633 of the first electrode 630 provided in a third region 613 of the first surface 610. That is, another layer of shielding is provided.

In this example, in the tubular configuration, the first electrode 630 extends around 3 perimeters of the electrode assembly 60 (i.e. P perimeters where P is a natural number 1). That is, in the tubular configuration, the first electrode 630 extends around 1080°, about the longitudinal axis of the tubular configuration.

Figure 15:
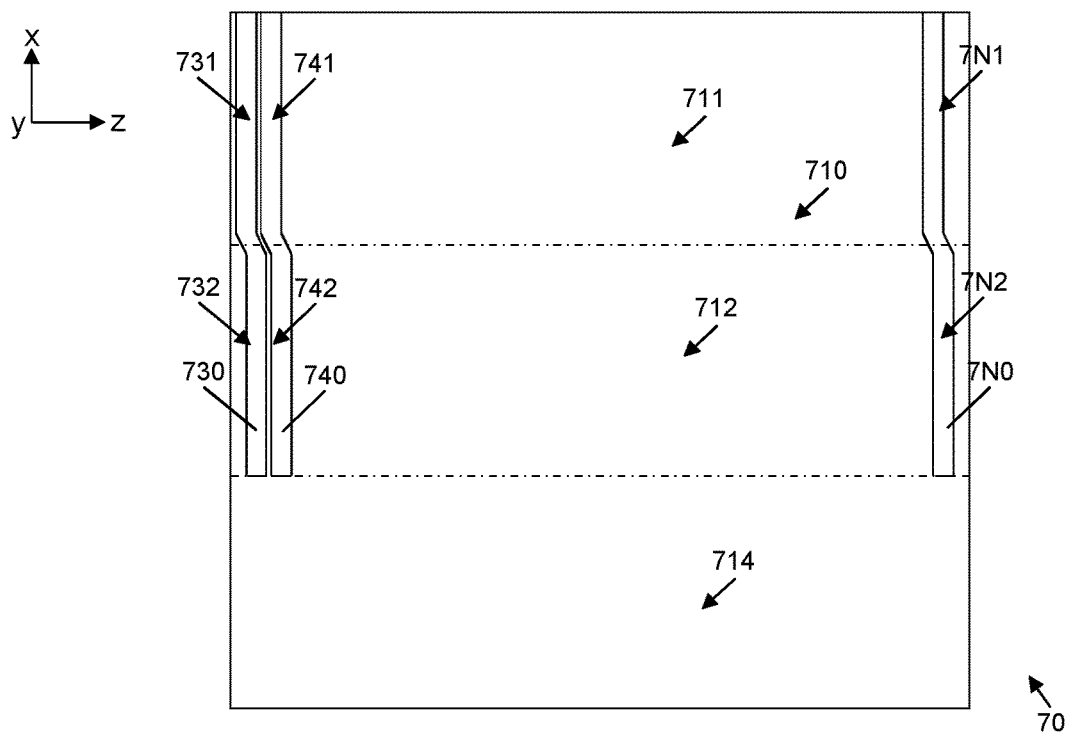
FIG. 15 schematically depicts an electrode assembly according to an exemplary embodiment, in a planar configuration.

FIG. 15 schematically depicts an electrode assembly 70 according to an exemplary embodiment, in a planar configuration. Particularly, FIG. 15 shows a plan view of the electrode assembly 70 in the planar configuration. A cross-section in the y-z plane of the electrode assembly 70 in the planar configuration is as described with respect to the electrode assembly 40 in the planar configuration.

Figure 16:
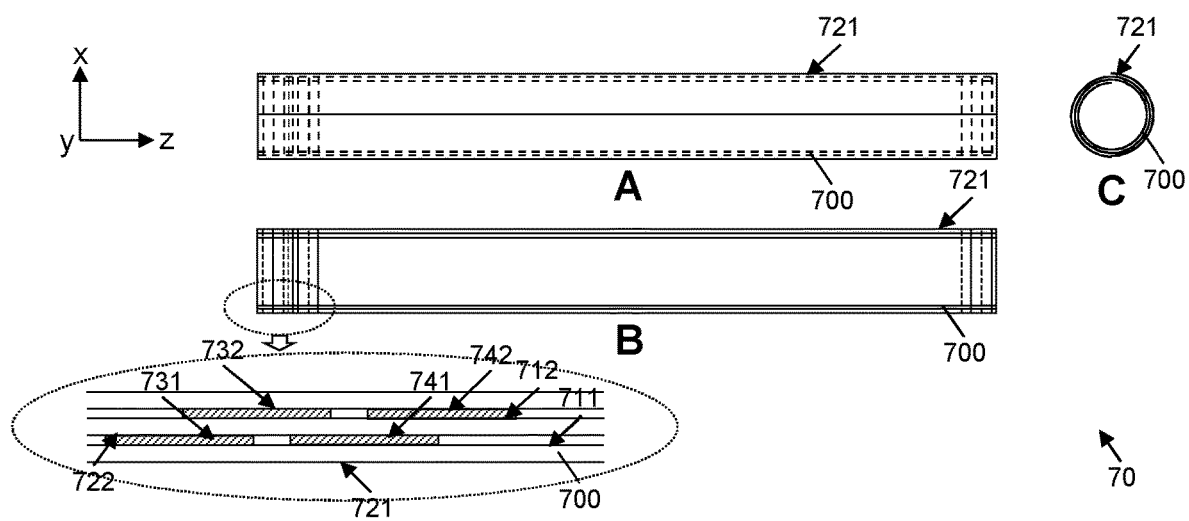
FIGS. 16A to 16C schematically depict the electrode assembly of FIG. 15, in a tubular configuration.

FIGS. 16A to 16C schematically depict the electrode assembly 70 of FIG. 15, in a tubular configuration. Particularly, FIG. 16A shows a plan view of the electrode assembly 70 in the tubular configuration, FIG. 16B shows a cross-section in the y-z plane of the electrode assembly 70 in the tubular configuration, including a portion in more detail, and FIG. 16C shows a cross-section in the x-y plane of the electrode assembly 70 in the tubular configuration.

The electrode assembly 70 comprises a first sheet 700, having first and second surfaces 710, 720 comprising a plurality of corresponding regions 711, 712, 721, 722. The first sheet 700 comprises a set of N electrodes 730, 740, including a first electrode 730 and a second electrode 740, provided as tracks mutually spaced apart on the first surface 710 thereof. The electrode assembly 70 is arrangeable in the planar configuration (FIG. 15) and the tubular configuration (FIGS. 16A to 16C). In the tubular configuration, a first part 731 of the first electrode 730, provided in a first region 711 of the first surface 710, overlays a second region 722 of the second surface 720. In the tubular configuration, the first part 731 of the first electrode 730 overlaps a second part 732 of the first electrode 730 and a second part 742 of the second electrode 740, provided in a second region 712 of the first surface 710. In the tubular configuration, the electrode assembly 70 provides an ion guide.

Otherwise as described below, the electrode assembly 70 is as described with respect to the electrode assembly 40. That is, for brevity, description of like features is not repeated.

Dielectric

In this example, the first surface 710 comprises a fourth region 714, isolated from the set of N electrodes, wherein the fourth region provides an inner surface of the ion guide. In this example, the fourth region 714 is adjacent to the second region 712.

Figure 17:
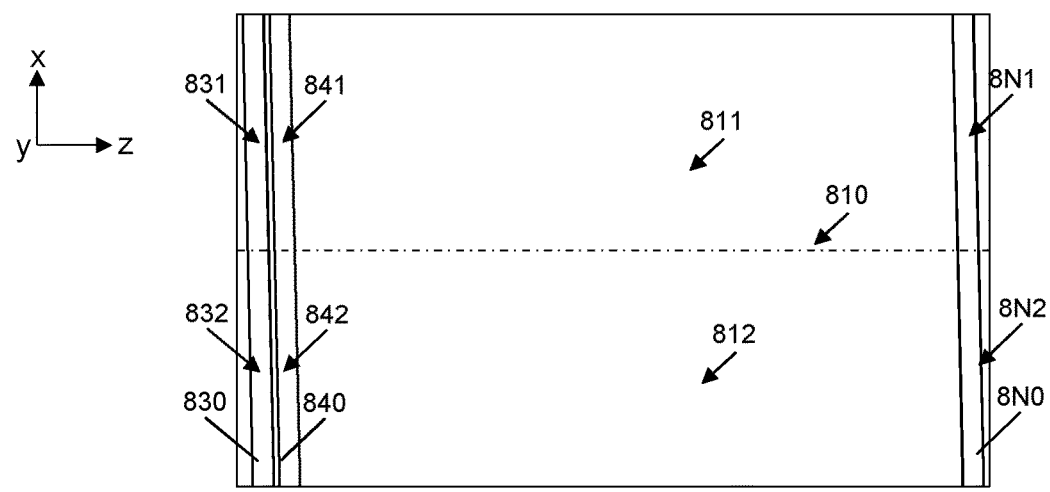
FIG. 17 schematically depicts an electrode assembly according to an exemplary embodiment, in a planar configuration.

FIG. 17 schematically depicts an electrode assembly 80 according to an exemplary embodiment, in a planar configuration. Particularly, FIG. 17 shows a plan view of the electrode assembly 80 in the planar configuration.

Figure 18:
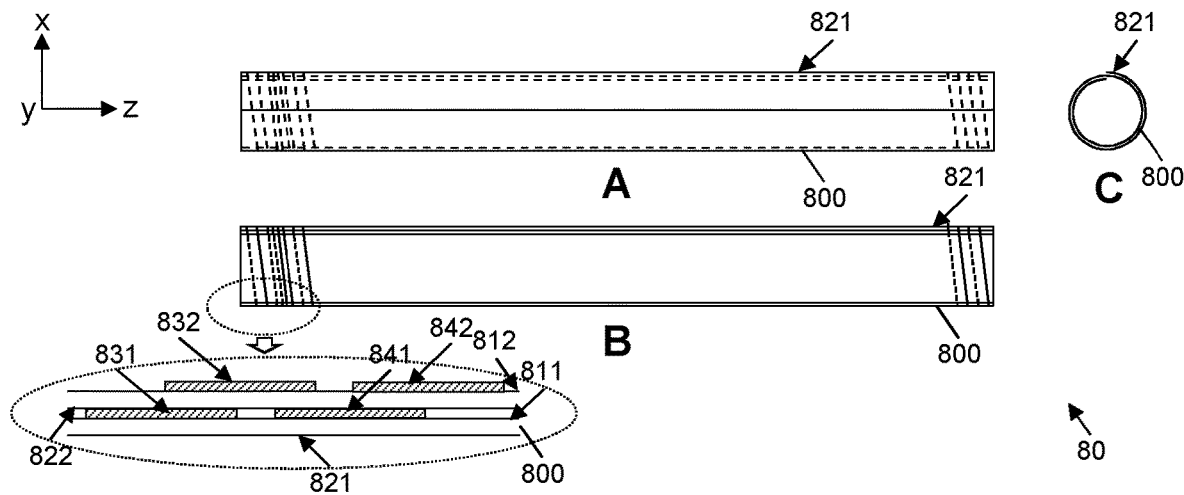
FIGS. 18A to 18C schematically depict the electrode assembly of FIG. 17, in a tubular configuration.

FIGS. 18A to 18C schematically depict the electrode assembly 80 of FIG. 17, in a tubular configuration. Particularly, FIG. 18A shows a plan view of the electrode assembly 80 in the tubular configuration, FIG. 18B shows a cross-section in the y-z plane of the electrode assembly 80 in the tubular configuration, including a portion in more detail, and FIG. 18C shows a cross-section in the x-y plane of the electrode assembly 80 in the tubular configuration.

The electrode assembly 80 comprises a first sheet 800, having first and second surfaces 810, 820 comprising a plurality of corresponding regions 811, 812, 821, 822. The first sheet 800 comprises a set of N electrodes 830, 840, including a first electrode 830 and a second electrode 840, provided as tracks mutually spaced apart on the first surface 810 thereof. The electrode assembly 80 is arrangeable in the planar configuration (FIGS. 3A to 3B) and the tubular configuration (FIGS. 8A to 8C). In the tubular configuration, a first part 831 of the first electrode 830, provided in a first region 811 of the first surface 810, overlays a second region 822 of the second surface 820. In the tubular configuration, the first part 831 of the first electrode 830 overlaps a second part 832 of the first electrode 830 and a second part 842 of the second electrode 840, provided in a second region 812 of the first surface 810. In the tubular configuration, the electrode assembly 80 provides an ion guide.

Otherwise as described below, the electrode assembly 80 is as described with respect to the electrode assembly 10. That is, for brevity, description of like features is not repeated.

Electrodes

In this example, the first electrode 830 and the second electrode 840 are arranged obliquely on the first sheet 800. In this way, in the tubular configuration, the first electrode 830 and the second electrode 840 define helices transverse to a longitudinal axis of the electrode assembly.

Overlapping

In the tubular configuration, the first part 831 of the first electrode 830 overlaps the second part 832 of the first electrode 830 and the second part 842 of the second electrode 840, provided in the second region 812 of the first surface 810. Hence, in the tubular configuration, the first part 831 of the first electrode 830 at least partially shields or covers the second part 832 of the first electrode 830 and/or the second part 842 of the second electrode 840 through the first sheet 800. In this way, thereby shielding of the set of N electrodes is improved. For example, if the first part 831 of the first electrode 830 overlaps the second part 832 of the first electrode 830, intra-electrode shielding or self-shielding of the first electrode 830 is provided. For example, if the first part 831 of the first electrode 830 overlaps the second part 842 of the second electrode 840, inter-electrode shielding of the second electrode 840 is provided by the first electrode 830. In this example, the first part 831 of the first electrode 830 overlaps a gap between the second part 832 of the first electrode 830 and the second part 842 of the second electrode 840. Preferably, the first part 831 of the first electrode 830 overlaps the second part 832 of the first electrode 830 and the second part 842 of the second electrode 840.

In this example, in the tubular configuration, the first part 831 of the first electrode 830 overlaps the second part 832 of the first electrode 830 by 50% of the width of the first part 831 of the first electrode 830.

In this example, in the tubular configuration, the first part 831 of the first electrode 830 overlaps the second part 842 of the second electrode 840 by about 80% of the width of the first part 831 of the first electrode 830.

In this example, in the tubular configuration, the first part 831 of the first electrode 830 overlaps a gap between the second part 832 of the first electrode 830 and the second part 842 of the second electrode 840.

Figure 19:
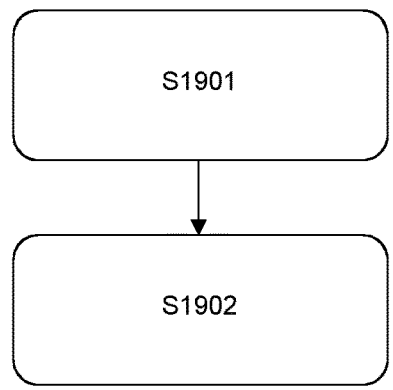
FIG. 19 schematically depicts a method of providing an ion guide according to an exemplary embodiment.

FIG. 19 schematically depicts a method of providing an ion guide according to an exemplary embodiment.

At S1901, the method comprises providing on a first sheet, having first and second surfaces comprising a plurality of corresponding regions, a set of N electrodes, including a first electrode and a second electrode, as tracks mutually spaced apart on the first surface thereof, thereby providing an electrode assembly.

At S1902, the method comprises arranging the electrode assembly in a tubular configuration from a planar configuration by overlaying a first part of the first electrode, provided in a first region of the first surface, and a second region of the second surface and overlapping a second part of the first electrode and/or a second part of the second electrode, provided in a second region of the first surface, with the first part of the first electrode; and where the electrode assembly arranged in the tubular configuration provides the ion guide.

The method may include any of the steps described herein.

Experimental Results

Ion mobility spectrometry (IMS) is a simple and fast analytical technique that can be used to identify chemical substances in real time. As such IMS is routinely used for a wide variety of portable applications, from improvised explosive device (IED) detection to pollution monitoring. However, despite its intrinsic simplicity and portability, IMS remains relatively expensive. Herein we demonstrate a new, innovative and low cost drift tube design which draws from modern materials and techniques widely used in electronics manufacturing. The design was implemented using a flexible laminated polyimide PCB on which an array of copper electrodes is printed to provide a linear drift tube voltage gradient without compromising field homogeneity. A network of SMD components can then be placed and the drift tube can be simply rolled up. In this presentation we will also discuss the possibility of using a network of Zener diodes and resistors to provide voltage stabilisation in between each ring assuring a constant drift tube voltage gradient regardless of the stability of the power supply.

In DT-IMS, the drift tube is central to the operation of the instrument and performs two key functions: i) accepts injected ions produced during the ionisation process (after passing through gating system), and, ii) generates a homogeneous electric field of a ~few hundred volts per centimetre.

For DT design, it is required that the field gradient, of a ~few hundred volts per cm along the central axis of the tube, has high uniformity. In practice it is common to use a succession of charged ring electrodes, in a stacked arrangement, connected to a series resistor network to provide discrete voltage increments.

Stacked DTs are manufactured by machining components and arranging alternately between electrode and insulator. This process can be complex, time consuming and costly. This usually leads to a heavier construction with a larger outer diameter (with respect to the maximal radial component of the ion trajectory). The stacked construction also consists of crevices and discontinuities that are prone to contamination and carry-over between experiments. Thermal mass of conventional DTs can be relatively high and increase start-up times.

Figure 20:
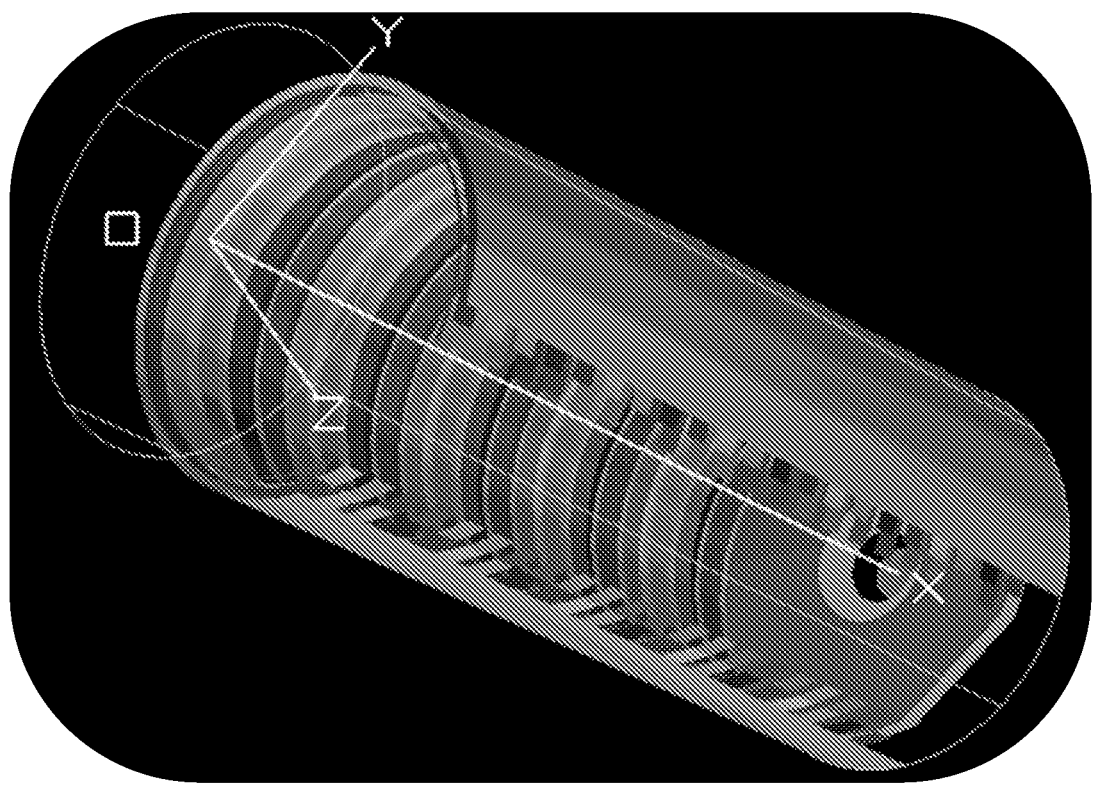
FIG. 20 schematically depicts a partial cutaway perspective view of an electrode assembly according to an exemplary embodiment, in a tubular configuration.

FIG. 20 schematically depicts a partial cutaway perspective view of an electrode assembly according to an exemplary embodiment, in a tubular configuration, similar to as described with reference to FIG. 6. Particularly, the electrode assembly provides a flexible PCB drift tube (DT).

Flexible PCB design allows for a rugged DT to be readily manufactured and easily assembled. Other DTs have been constructed previously using flex-circuit technology in which every other drift electrode is on a different layer of a flex-circuit. Our approach reduces complexity whilst improving homogeneity of the electric field. The DT is printed on a single sheet of dielectric (e.g., polyimide) and readily rolled up to produce a tubular DT region. Kapton is used as the flexible PCB substrate. This material withstands temperatures in excess of 250° C., is an excellent dielectric, with good resistance to most solvents, weak acids and bases, and high tensile strength. Surface mount components can be readily integrated on to the single sheet, including possibility of a ground layer and other control electronics. We explore the use of Zener diodes, providing independent voltage stabilisation, to enable the use of the same high voltage (HV) power supply for both the ion source and the drift tube, which can simplify system design. For the sake of simplicity, adhesive copper tape can be used as opposed to etched copper on the laminated PCB but this limits to extent of the DT capability. The electrodes overlap to provide 'self-shielding' and improve the homogeneity of the electric field. We also explore a design that utilises a number of 'dog legs' to readily increase the number of electrode layers for the rolled up tube and aids manufacturability and assembly.

Figure 21:
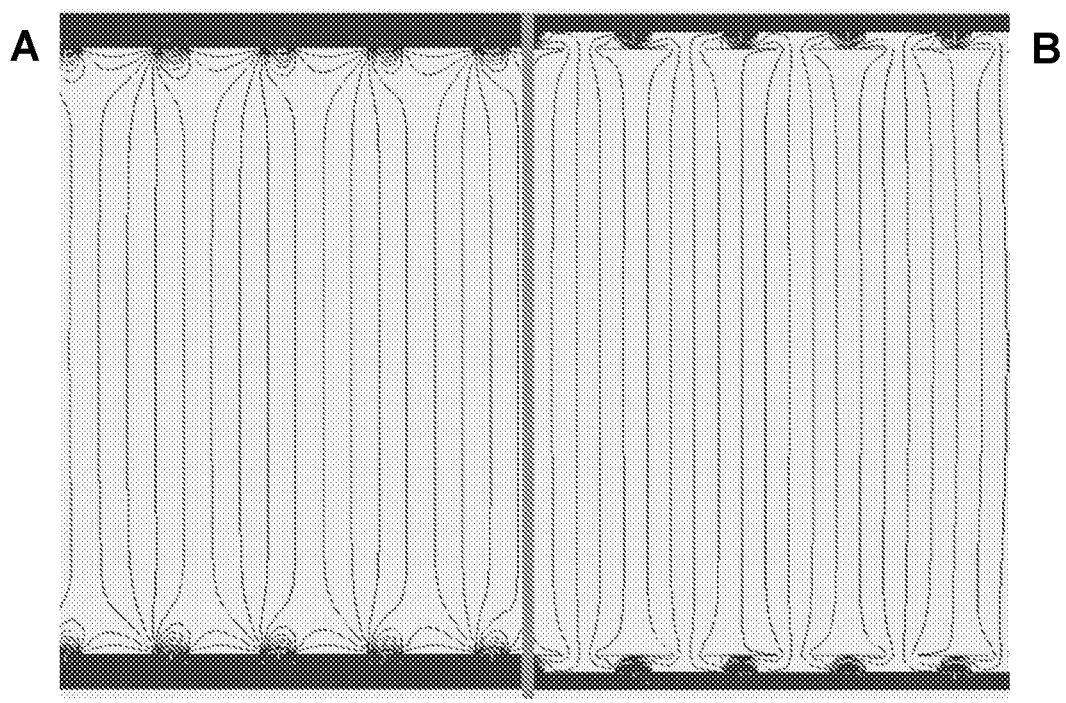
FIGS. 21A to 21B respectively schematically depict a simulation of a conventional electrode assembly, in a tubular configuration and a simulation of the electrode assembly of FIG. 20, in a tubular configuration.

FIGS. 21A to 21B respectively schematically depict a simulation of a conventional electrode assembly, in a tubular configuration and a simulation of the electrode assembly of FIG. 20, in a tubular configuration, similar to as described with respect to FIGS. 7 and 8 respectively. Particularly, FIGS. 21A to 21B contrast electric fields for non-overlapping (FIG. 21A) and overlapping (FIG. 21B) electrodes.

Simion simulations (FIGS. 21A to 21B) illustrate the self-shielding provided by overlapped electrodes (FIG. 21B). Electrodes each overlap by 25% of their width. A clear distinction in field homogeneity is observed. This leads to a reduction in distortion of the electric field (FIG. 21B).

Figure 22:
FIG. 22 schematically depicts the electrode assembly of FIG. 20, in a planar configuration.

FIG. 22 schematically depicts the electrode assembly of FIG. 20, in a planar configuration, similar to as described with respect to FIG. 5. Particularly, FIG. 22 shows an unrolled, flexible DT with Zener and RC components (C is due, in part, to the tubular configuration).

Figure 23:
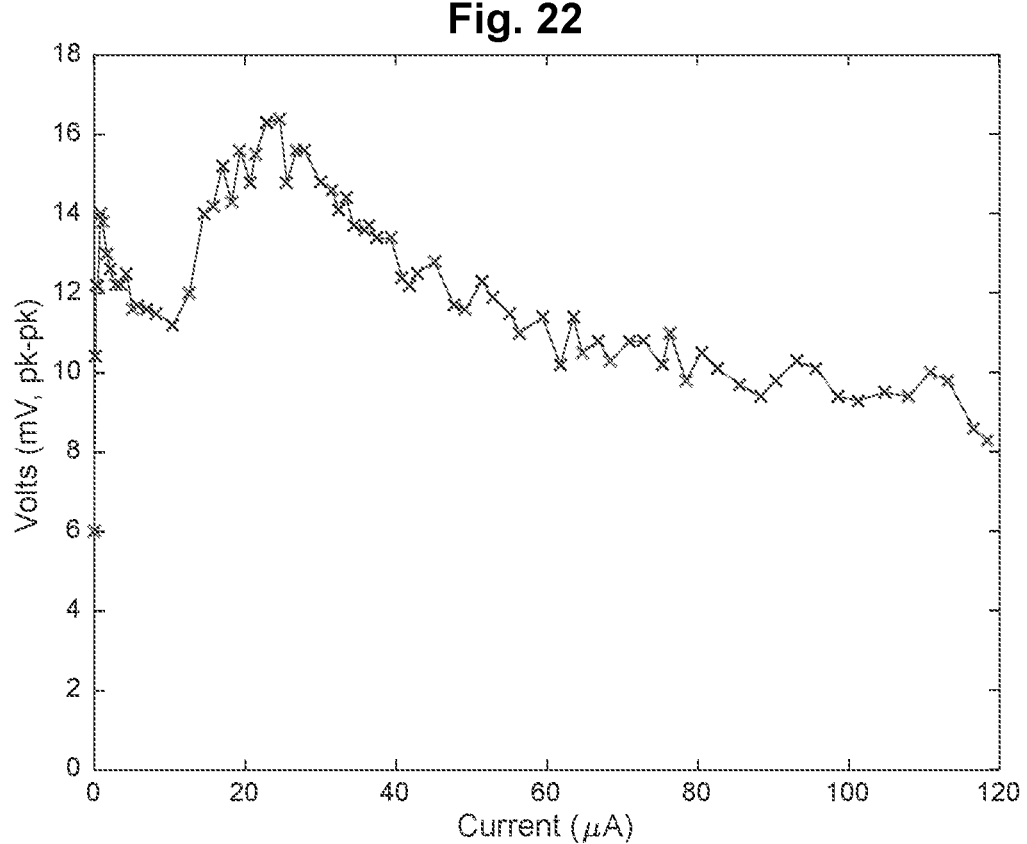
FIG. 23 is a graph of noise versus current response for the electrode assembly of FIG. 20.

FIG. 23 is a graph of noise versus current response for the electrode assembly of FIG. 20. Particularly, FIG. 23 shows a graph of noise versus current response of the DT/detector assembly with 50 MΩ HV resistor in series with the tube, at ambient temperature.

In order to reflect real world operation, the noise was measured from the amplifier output, with the tube installed in a DT-IMS setup. A low pass RC filter reduces the possibility of coupling with the aperture grid. For the Zener assembly, the components are connected to an array of Zener diodes (including the aperture grid, through an RC low pass filter). With a simple low pass RC filter (FIG. 22), the noise amplitude can be reduced to a level similar to that of the amplifier and, for this particular experiment, oscilloscope (FIG. 23). Furthermore, to investigate whether temperature would negatively affect the noise, the tube was heated to 40° c. Preliminary results show the opposite was found to occur as the Zener voltage will shift according to the temperature coefficient of the diode. As the leakage current increases, the noise reduces, similar to the noise trend under ambient temperature conditions.

Figure 24:
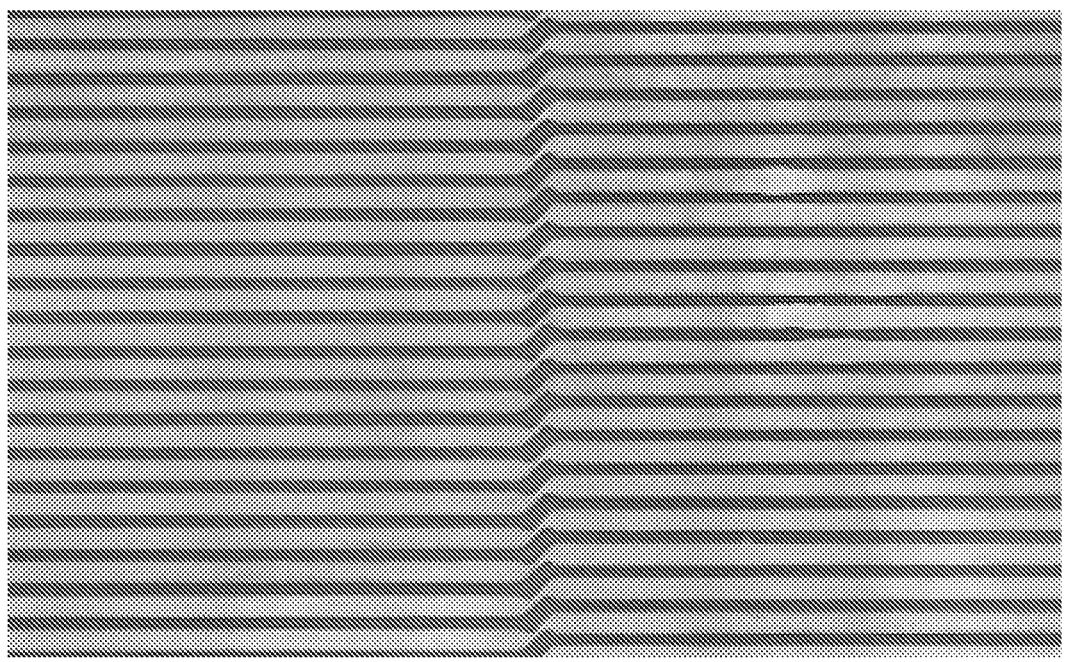
FIG. 24 schematically depicts an electrode assembly according to an exemplary embodiment, in a planar configuration.

FIG. 24 schematically depicts an electrode assembly according to an exemplary embodiment, in a planar configuration, similar to as described with respect to FIG. 9. Particularly, FIG. 24 shows a 'dog-leg' design using SMD resistors for improved performance.

An alternative design for the electrode assembly incudes a number of dog legs, or similar, which can be increased to give more than 2 layers (FIG. 24). A series of appropriate SMD resistors provide a linear voltage gradient. When rolled up, partially overlapping electrodes provide self-shielding.

Figure 25:
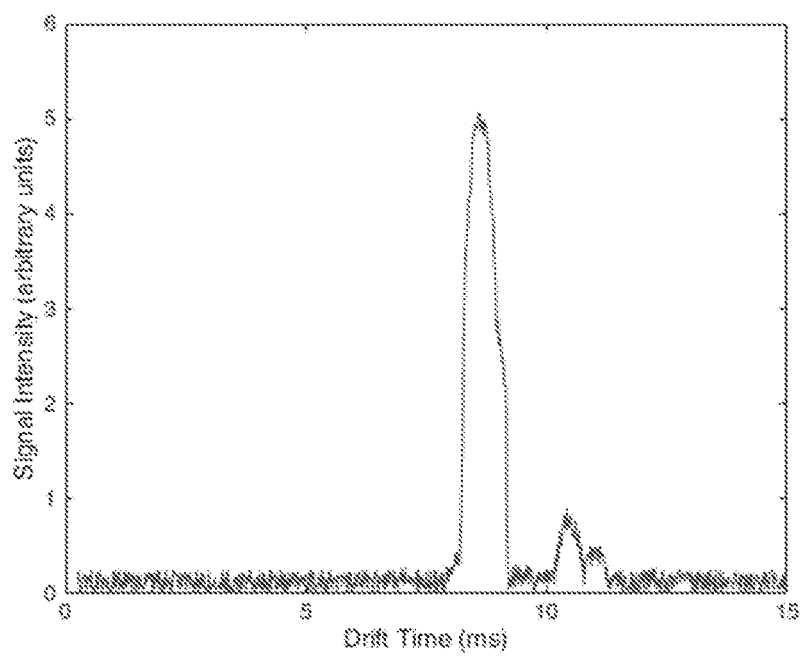
FIG. 25 is an IMS spectrum for TNT acquired using the electrode assembly of FIG. 25, in a tubular configuration.

FIG. 25 is an IMS spectrum for TNT acquired using the electrode assembly of FIG. 25, in a tubular configuration.

A typical spectrum for TNT illustrates the operation of this simple DT-IMS. This spectrum is achieved using a custom-built corona discharge ion source in negative mode. DT-IMS spectrum (FIG. 25) for 5 ng of TNT (diluted in methanol).

Through this work we have shown: i) voltage stabilisation via Zener diodes with integrated RC network, ii) overlapping electrodes provide self-shielding, and, iii) single-sheet 'dog-leg' design for self-shielding and easy manufacture. Whilst flex-electronics and Zener stabilisation compromises an optimally configured DT-IMS, the design provides certain advantages: reduced cost, space savings and simplification of the tube driver electronics & tube construction. Multi-layered single sheet design via 'dog-leg' electrodes, negates such compromise and makes for good performance with easy manufacture and assembly.

Housing

Figure 26:
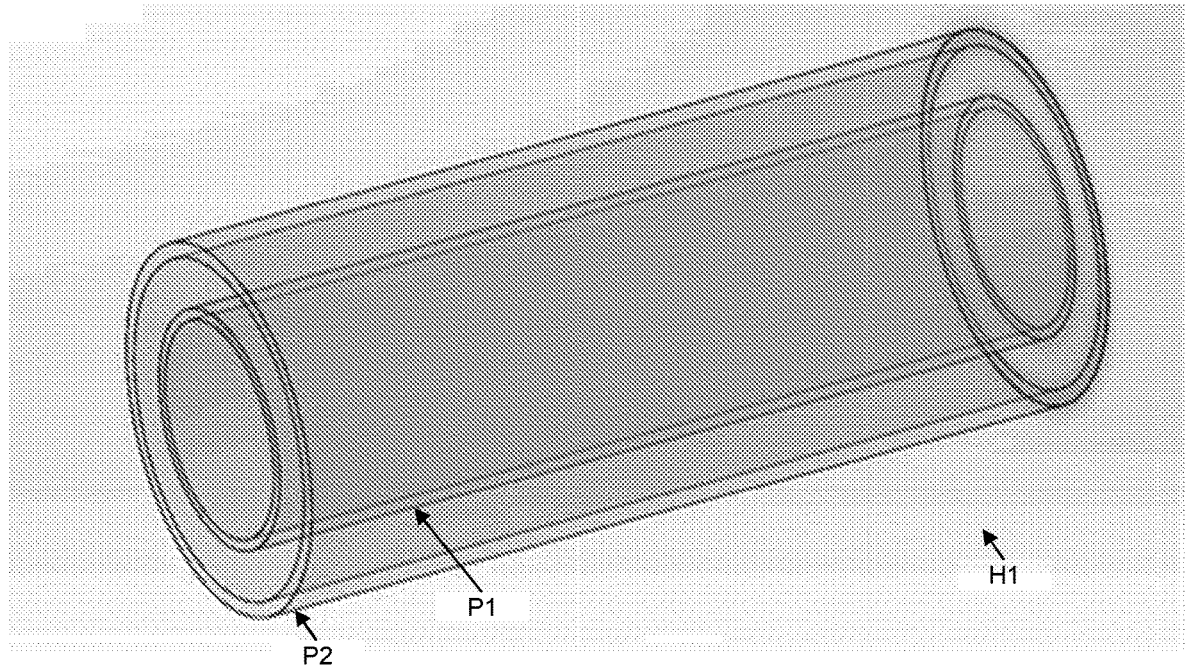
FIG. 26 depicts a CAD perspective view of a housing for an electrode assembly according to an exemplary embodiment arranged in a tubular configuration.

FIG. 26 depicts a CAD perspective view a housing H1 for an electrode assembly according to an exemplary embodiment arranged in a tubular configuration.

In this example, the housing H1 comprises two coaxial pipes P1, P2, having equal lengths. A radial gap is provided between the two coaxial pipes P1, P2. A bore of the inner pipe P1 is arranged to receive the electrode assembly, arranged in the tubular configuration, therein, wherein an outer surface of the electrode assembly is proximal an inner surface of the inner pipe P1, spaced apart therefrom by a gap of about 2-3 mm. The two coaxial pipes P1, P2 are formed from an electrically and thermally insulating material.

Figure 27:
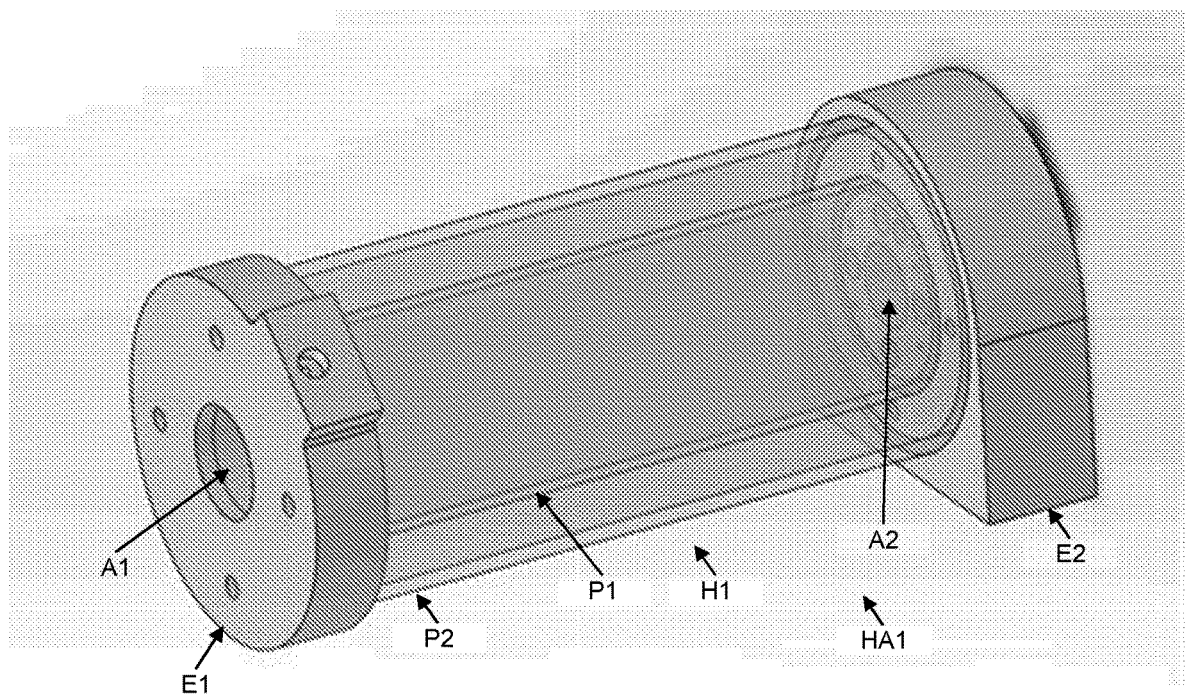
FIG. 27 depicts a CAD perspective view of a housing assembly, including the housing of FIG. 26.

FIG. 27 depicts a CAD perspective view of a housing assembly HA1, including the housing H1 of FIG. 26.

In this example, the housing assembly HA1 comprises two opposed ends E1, E2, each having two circular grooves therein, corresponding to the diameters of the two coaxial pipes P1, P2, for holding the two coaxial pipes P1, P2 between the opposed ends E1, E2. The ends E1, E2 comprise on-axis circular apertures A1, A2 respectively. Aperture A1 allows for passage of ions into the housing assembly HA1 while an ion detector is provided in the aperture A2.

Figure 28:
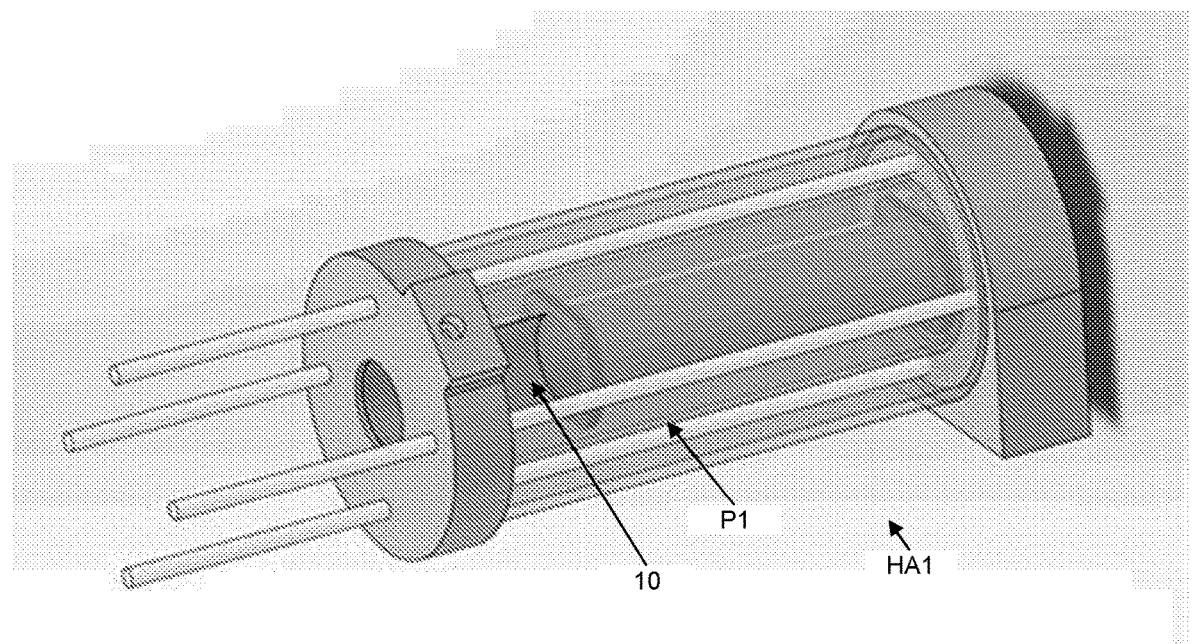
FIG. 28 depicts a CAD perspective view of the housing assembly of FIG. 27, comprising an electrode assembly according to an exemplary embodiment arranged in a tubular configuration.

FIG. 28 depicts a CAD perspective view of the housing assembly HA1 of FIG. 27, comprising an electrode assembly 10 according to an exemplary embodiment arranged in a tubular configuration.

Figure 29:
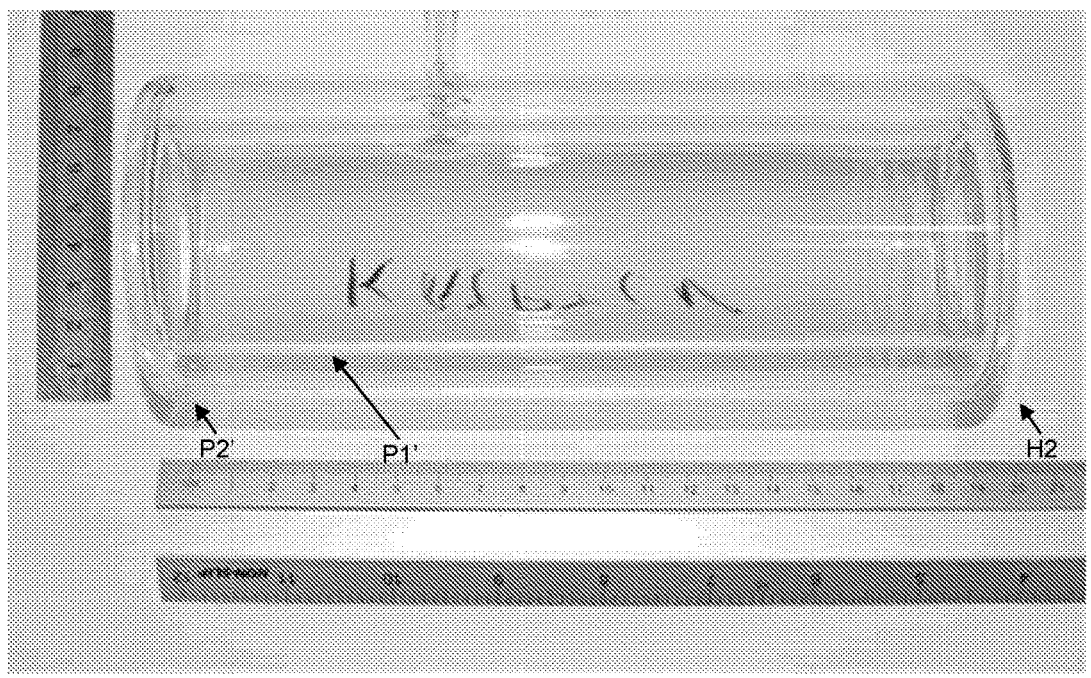
FIG. 29 shows a photograph of a housing for an electrode assembly according to an exemplary embodiment arranged in a tubular configuration.

In this example, the electrode assembly 10, arranged in the tubular configuration, is received in a bore of the inner pipe P1 whereby an outer surface of the electrode assembly 10 is proximal to an inner surface of the inner pipe P1. The gap provided therebetween improves thermal stability of the electrode assembly 10 arranged in the tubular configuration FIG. 29 shows a photograph of a housing H2 for an electrode assembly according to an exemplary embodiment arranged in a tubular configuration.

In this example, the housing H2 comprises two coaxial pipes P1', P2', having equal lengths of 200 mm, and is generally as described with respect to the housing H1. The two coaxial pipes P1, P2 are formed from glass. The inner diameter of the inner pipe P1' is 48 mm and the inner pipe P1' has a wall thickness of 2.5 mm. The outer diameter of the outer pipe P2' is 78 mm and the outer pipe P2' has a wall thickness of 3 mm. Hence, a radial gap of 9.5 mm is provided between the two coaxial pipes P1, P2. In use, the radial gap is filled with aerogel, to improve thermal insulation and hence thermal stability of the electrode assembly 10.

Although a preferred embodiment has been shown and described, it will be appreciated by those skilled in the art that various changes and modifications might be made without departing from the scope of the invention, as defined in the appended claims and as described above.

In summary, the invention provides an electrode assembly, an ion spectrometer comprising an electrode assembly and method of providing an ion guide. In this way, the ion guide has a reduced complexity and/or cost, since the set of N electrodes are provided on the first surface of the first sheet. That is, multi-layering and/or double-siding of the first sheet are not required. In addition, homogeneity and/or linearity of an electric field provided by the ion guide is improved, since the first electrode overlaps the second part of the first electrode and/or the second part of the second electrode, thereby shielding the second part of the first electrode and/or the second part of the second electrode respectively. Further, since the set of N electrodes are provided on the first surface of the first sheet and since the first part of the first electrode overlaps the second part of the first electrode and/or the second part of the second electrode, the number N of electrodes may be increased because connectivity requirements between the N electrodes is reduced. In simple terms, the connectivity requirements may be halved by this overlaying and overlapping and therefore double the number N of electrodes may be accommodated in a given area. Furthermore, a flexibility of the electrode assembly may be improved since the set of N electrodes are provided on the first surface of the first sheet, thereby enabling provision of the ion guide therefrom having a relatively smaller minimum radius without risk of delamination i.e. increasing robustness thereof. It should be understood that the electrode assembly is a flexible electrode assembly.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at most some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims and drawings), or to any novel one, or any novel combination, of the steps of any method or process so disclosed.

The invention claimed is:

1. An electrode assembly comprising:
a first sheet, having first and second surfaces comprising a plurality of corresponding regions, wherein a first region of the second surface is the reverse of a first region of the first surface and wherein a second region of the second surface is the reverse of a second region of the first surface, comprising a set of N electrodes, including a first electrode and a second electrode, provided as tracks mutually spaced apart by a gap on the first surface thereof, wherein N is a natural number greater than or equal to 2;
wherein a first part of the first electrode is provided in the first region of the first surface and wherein a second part of the first electrode is provided in the second region of the first surface;
wherein a first part of the second electrode is provided in the first region of the first surface and wherein a second part of the second electrode is provided in the second region of the first surface;
wherein the second part of the first electrode is laterally offset from the first part of the first electrode by a doq leg portion;
wherein the electrode assembly is arrangeable in a tubular configuration from a planar configuration by rolling the first sheet;
wherein, in the tubular configuration, the first part of the first electrode overlays the second region of the second surface, whereby the first part of the first electrode is layered between the first sheet;
wherein, in the tubular configuration, the first part of the first electrode overlaps the second part of the first electrode, the second part of the second electrode and/or the gap between the second part of the first electrode and the second part of the second electrode, whereby the first part of the first electrode at least partially shields the second part of the first electrode and/or the second part of the second electrode through the first sheet; and
wherein, in the tubular configuration, the electrode assembly provides an ion guide for an ion spectrometer.

2. The electrode assembly according to claim 1, wherein the tubular configuration is a cylindrical configuration.

3. The electrode assembly according to claim 1, wherein in the tubular configuration, the first part of the first electrode overlaps the second part of the first electrode by an amount in a range from 5% to 100%, of a width of the first part and/or the second part of the first electrode.

4. The electrode assembly according to claim 1, wherein in the tubular configuration, the first part of the first electrode overlaps the second part of the second electrode by an amount in a range from 5% to 100% of a width of the first part of the first electrode and/or the second part of the second electrode.

5. The electrode assembly according to claim 1, wherein in the tubular configuration:
the second part of the first electrode overlays a third region of the second surface; and
the first part and/or the second part of the first electrode overlaps a third part of the first electrode provided in a third region of the first surface.

6. The electrode assembly according to claim 1, wherein in the tubular configuration:
the first part of the second electrode provided in the first region of the first surface overlays the second region of the second surface; and
the first part of the second electrode overlaps the second part of the first electrode and/or the second part of the second electrode.

7. The electrode assembly according to claim 1, wherein the first electrode and the second electrode are mutually equispaced and/or mutually parallel.

8. The electrode assembly according to claim 1, comprising a first resistor, wherein the first electrode and the second electrode are coupled via the first resistor.

9. The electrode assembly according to claim 1, wherein the first sheet comprises a ground electrode provided in a first region of the second surface thereof.

10. The electrode assembly according to claim 1, wherein the first surface comprises a fourth region, isolated from the set of N electrodes, wherein the fourth region provides an inner surface of the ion guide.

11. The electrode assembly according to claim 1, wherein the set of N electrodes includes from 3 to 1000 electrodes including the first electrode and the second electrode.

12. The electrode assembly according to claim 1, wherein, in the tubular configuration, the first electrode extends around at least P perimeters of the electrode assembly, where P is a natural number >1.

13. An ion spectrometer comprising an electrode assembly according to claim 1, wherein the electrode assembly is arranged in the tubular configuration.

14. The ion spectrometer according to claim 13, comprising a housing for the electrode assembly, wherein the housing comprises a set of pipes including a first pipe and a second pipe.

15. The electrode assembly according to claim 1, comprising a Zener diode, wherein the first electrode and the second electrode are coupled via the Zener diode.

16. A method of providing an ion guide for an ion spectrometer, the method comprising:
   providing on a first sheet, having first and second surfaces comprising a plurality of corresponding regions, wherein a first region of the second surface is the reverse of a first region of the first surface and wherein a second region of the second surface is the reverse of a second region of the first surface, a set of N electrodes, including a first electrode and a second electrode, as tracks mutually spaced apart by a cap on the first surface thereof, wherein N is a natural number greater than or equal to 2, thereby providing an electrode assembly,
   wherein a first part of the first electrode is provided in the first region of the first surface and wherein a second part of the first electrode is provided in the second region of the first surface;
   wherein a first part of the second electrode is provided in the first region of the first surface and wherein a second part of the second electrode is provided in the second region of the first surface;
   wherein the second part of the first electrode is laterally offset from the first part of the first electrode by a doq leg portion; and
   arranging the electrode assembly in a tubular configuration from a planar configuration by rolling the first sheet, thereby overlaying the first part of the first electrode and the second region of the second surface, whereby the first part of the first electrode is layered between the first sheet and overlapping the second part of the first electrode, the second part of the second electrode and/or qap between the second part of the first electrode and the second part of the second electrode with the first part of the first electrode, whereby the first part of the first electrode at least partially shields the second part of the first electrode and/or the second part of the second electrode through the first sheet; and
   wherein the electrode assembly arranged in the tubular configuration provides the ion guide for the ion spectrometer.

17. The method according to claim 16, wherein arranging the electrode assembly in the tubular configuration is by rolling the first sheet comprising the set of N electrodes into a cylindrical configuration.

18. The method according to claim 16, comprising coupling the first electrode and the second electrode via a first resistor, before arranging the electrode assembly in the tubular configuration.

19. The method according to claim 16, comprising providing a ground electrode provided in a first region of the second surface, before arranging the electrode assembly in the tubular configuration.

20. The method according to claim 16, comprising coupling the first electrode and the second electrode via a Zener diode, before arranging the electrode assembly in the tubular configuration.

* * * * *